(12) United States Patent
Kodama et al.

(10) Patent No.: US 10,092,982 B2
(45) Date of Patent: Oct. 9, 2018

(54) FILLET WELDED JOINT AND METHOD OF PRODUCTION OF SAME

(71) Applicant: NIPPON STEEL & SUMITOMO METAL CORPORATION, Tokyo (JP)

(72) Inventors: Shinji Kodama, Tokyo (JP); Shoko Oami, Tokyo (JP); Koichi Sato, Tokyo (JP); Yoshiaki Nakazawa, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/550,261

(22) PCT Filed: Feb. 12, 2016

(86) PCT No.: PCT/JP2016/054185
§ 371 (c)(1),
(2) Date: Aug. 10, 2017

(87) PCT Pub. No.: WO2016/129690
PCT Pub. Date: Aug. 18, 2016

(65) Prior Publication Data
US 2018/0029166 A1 Feb. 1, 2018

(30) Foreign Application Priority Data

Feb. 13, 2015 (JP) .................................. 2015-026742
May 29, 2015 (JP) .................................. 2015-110314

(51) Int. Cl.
*B23K 31/02* (2006.01)
*B23K 9/235* (2006.01)
*B23K 9/02* (2006.01)

(52) U.S. Cl.
CPC ................ *B23K 31/02* (2013.01); *B23K 9/02* (2013.01); *B23K 9/235* (2013.01)

(58) Field of Classification Search
CPC . B23K 9/00; B23K 9/02; B23K 9/025; B23K 9/09; B23K 9/173; B23K 9/23;
(Continued)

(56) References Cited

U.S. PATENT DOCUMENTS 6,290,905 B1 * 9/2001 Watanabe .......... B23K 35/3086
148/325
2015/0071703 A1 3/2015 Ishida et al.
2015/0196967 A1 7/2015 Tsuchiya et al.

FOREIGN PATENT DOCUMENTS

JP 51-39629 B 10/1976
JP 54-100925 A 8/1979
(Continued)

OTHER PUBLICATIONS

International Preliminary Report on Patentability and English Translation of Written Opinion of the Intenational Searching Authority, issued in PCT/JP2016/054185, dated Aug. 15, 2017 (Forms PCT/IB/373 and PCT/ISA/237).
(Continued)

*Primary Examiner* — Brian Jennison
(74) *Attorney, Agent, or Firm* — Birch, Stewart, Kolasch & Birch, LLP

(57) ABSTRACT

The present invention provides a fillet welded joint and a method of production of a fillet welded joint which can raise the productivity of the method of production of a fillet welded joint and a fillet welded joint without sacrificing the strength against fatigue fracture of the welded structural member. The fillet welded joint of the present invention is a fillet welded joint formed by fillet welding at least two metal members, wherein, on the surface of at least one of the metal members, the fillet welded joint comprises a press bead of a rib-shaped projection provided by press-forming so as to project upward to the side having a weld bead formed by the
(Continued)

fillet welding, and part of the press bead contacts or overlaps the weld bead.

15 Claims, 14 Drawing Sheets

(58) Field of Classification Search
CPC ........ B23K 9/235; B23K 31/02; B23K 31/12; B23K 35/0266; B23K 35/3053
USPC ..................................................... 219/137 R
See application file for complete search history.

(56) References Cited

FOREIGN PATENT DOCUMENTS

| | | | |
|---|---:|---|---:|
| JP | 5-245630 | A | 9/1993 |
| JP | 9-253843 | A | 9/1997 |
| JP | 2003-341391 | A | 12/2003 |
| JP | 2006-326631 | A | 12/2006 |
| JP | 2008-221300 | A | 9/2008 |
| JP | 2010-110793 | A | 5/2010 |
| JP | 2013-31878 | A | 2/2013 |
| JP | 2014-4609 | A | 1/2014 |
| JP | 5522317 | B2 | 6/2014 |
| WO | WO 2013/157557 | A1 | 10/2013 |
| WO | WO 2014/084317 | A1 | 6/2014 |

OTHER PUBLICATIONS

International Search Report issued in PCT/JP2016/054185, dated May 10, 2016 (Form PCT/ISA/210).

* cited by examiner (a)

(b)

(c)

(d)

(a) STRAIGHT PART (b) CURVED PART (c) VICINITY OF END PART (d) FRONT END PART (1)

(2)

(1)

(2)

(a)

(b)

(COMPARATIVE EXAMPLE)

US 10,092,982 B2

1

FILLET WELDED JOINT AND METHOD OF PRODUCTION OF SAME

TECHNICAL FIELD

The present invention relates to a fillet welded joint and a method of production of the same, more particularly relates to ones suitable for use for fillet welding a plurality of metal members.

BACKGROUND ART

In the past, in the automotive field, for conservation of the environment, reduction of the weight of car bodies to improve fuel efficiency and improvement of collision safety have been sought. For this reason, various attempts have been made up to now to use high strength steel sheet to reduce thicknesses and to optimize car body structure to reduce the weight of car bodies and improve collision safety.

Large fatigue strength is also being demanded from high strength steel sheet for reducing the weight of car bodies. In particular, in suspension arms, subframes, and other chassis members, the fatigue strength of the welded zones becomes more important. To weld these chassis members, fillet arc welding is often used. Therefore, to reduce the weight of chassis members, the challenge is to raise the fatigue strength of the fillet arc welded joints.

FIG. 1A shows the cross-sectional shape of a typical lap fillet welded joint formed by superposing an upper steel material 1 and lower steel material 2 and welding only the perpendicular crossing parts at one side among the perpendicularly crossing parts formed at the two sides of the abutting parts of the upper steel material 1 and lower steel material 2. In the following explanation, the fillet weld bead will when necessary be called a "fillet bead". In such a lap fillet welded joint, if tensile loads F1 and F2 act on the upper and lower steel sheets, rotational deformation occurs about the fillet bead 3, stress concentrates at the toe 4 or the root 5 of the fillet bead 3, a fatigue crack proceeds in a direction vertical to the load, and the welded joint breaks. For this reason, to improve the fatigue strength, it becomes important to reduce the stress concentration at the toe 4 or root 5.

As the method of improving the fatigue strength of the welded joint, in the past, efforts have been made to reduce the stress concentration at the weld toe mainly by improvement of the bead shape. For example, post-processing is performed to increase the flank angle by grinding the weld toe or by remelting the toe by TIG welding. Furthermore, PLT 1 proposes to provide a slanted part at a weldable member in advance by press-forming and perform the welding so that the weld bead is superposed on that slanted part to thereby increase the flank angle of the toe of the weld bead.

PLTs 2 and 3 disclose the art of augmenting a weld bead to ease the stress concentration at the weld toe. Specifically, PLT 2 discloses the art of extending the weld bead, while PLT 3 discloses the art of forming a stiffening bead.

PLTs 4 and 5 disclose the art of treating a weld bead and smoothing the weld toe to ease the stress concentration at the weld toe. Specifically, PLT 4 discloses the art of brazing the weld bead, while PLT 5 discloses the art of using plasma to remelt the weld toe.

PLT 6 discloses the art of press-forming a weldable member so as to form a projection in advance near the location scheduled for welding where the weld bead will be formed and thereby ease the stress concentration at the weld zone. Specifically, PLT 6 discloses superposing and welding a plurality of sheet-shaped members to form a straight weld zone and forming press beads in shapes surrounding the two end parts so as to make the tensile load and torsional load applied to the sheet-shaped members be absorbed by the press beads and prevent stress from concentrating at the two end parts of the straight weld zone.

PLT 7 discloses providing an upwardly projecting bead part at a side wall part side of a lower rail of a flat sheet-shaped bracket to run along the side wall part of the lower rail. PLT 7 discloses using the upwardly projecting bead part to increase the interval between an arc welding torch and the top surface of the bracket and improve the weldability in the arc welding.

PLT 8 discloses a weld fastening structure of a lid hemming part for automobile use. PLT 8 discloses to fasten the edges of a lid outer panel folded along the edges of a lid inner panel by arc welding to a raised part of the inner panel so as to be able to sufficiently withstand the large external force at the time of collision etc.

However, these techniques have little effect on improvement of the fatigue strength of the portions where stress structurally concentrates such as in the lap fillet welded joint shown in FIG. 1A, that is, the toe 4 and the root 5. A fundamental improvement in fatigue strength cannot be realized. In particular, in a welded member of thin steel sheets, since the sheets are thin, the member falls in rigidity. Due to the carried load, the part of the lower steel material 2 of FIG. 1A which overlaps the bottom side of the upper steel material 1 easily deforms by rotation about the fillet bead 3. For this reason, a fatigue crack sometimes forms not only from the weld toe 4, but also from the root 5. With just improvement of the shape of the weld toe, the fatigue strength or fatigue life is insufficiently improved.

Further, in a thin sheet welded structure, to prevent weld deformation due to excessive weld heat input, in many cases, not the entire length of the joint is welded: The welded structure is prepared by partial weld beads 301 such as shown in FIG. 1B(a). Each of the partial weld beads 301 is formed with a beginning 301S and an ending part 301E. The conventional technique for improvement of the bead shape is art covering a middle portion 301M stable in the weld bead shape shown in FIG. 1B(c). However, as shown in FIG. 1B(b), the beginning 301S insufficiently penetrates the matrix, has a toe of an upwardly projecting shape, and easily becomes a location for formation of a fatigue crack in the toe 4S. Further, as shown in FIG. 1B(d), the ending part 301E becomes reduced in thickness of weld metal and easily suffers from cracks from the root 5E. In this way, in an actual welded structure, cracks easily form at the beginning and the end 301S and 301E of the weld bead, so no effect of improvement of the fatigue strength of the welded structure as a whole can be expected.

That is, with thin steel sheet welded members, to improve the fatigue strength of a welded structure, in particular one including a lap fillet welded joint or T-fillet welded joint, it is considered important to raise the rigidity of the members to suppress out-of-plane deformation and thereby reduce the structural stress concentration. If possible to raise the rigidity of the members and lower the structural stress concentration, it may become possible to obtain the effect of improvement of the fatigue strength of the welded structure as a whole including the beginning and root of the weld bead.

PLT 9 proposes forming an arc weld bead for stiffening use separate from a fillet bead so that the position of the weld beginning point overlaps the fillet bead and so that the position of the weld ending point becomes the front surface of the lower steel sheet whereby this functions as a member for raising the alloying of the steel sheet and weld metal in the direction to which the bending moment is applied and suppresses bending of the lower steel sheet.

Further, in the past, as means for improving the fatigue strength of a fillet welded joint, the practice has been to weld a rib or other reinforcing member with a suitable shape and position. However, if welding a separate member, this leads to an increase in costs, so these means are not art able to be applied to the production of mass production parts such as auto parts.

To deal with such a problem, PLT 10 proposes the art of fillet arc welding one metal member and another metal member to produce a welded joint during which forming on the surface of at least one of the metal members at least one bead beginning from the fillet bead and separate from the fillet bead in the same plane as the fillet bead by a required angle to thereby improve the fatigue strength of the welded joint.

However, in the arts disclosed in PLTs 9 and 10, it is necessary to form the fillet bead, then form the stiffening weld bead in a predetermined direction with respect to the fillet bead, so there are the problems that application to a part with a complicated shape is difficult, the welding steps increase, and improvement of the productivity is limited.

Further, in general, at the beginning point of a weld bead, penetration becomes insufficient and weld defects easily occur. In the arts disclosed in PLTs 9 and 10, the weld beginning point of the stiffening bead overlaps the fillet weld bead, so at the overlapping part, penetration is liable to become insufficient and a weld defect is liable to occur. On the other hand, if sufficiently heating the weld beginning point of the stiffening bead to eliminate the problem with penetration of the stiffening bead in the matrix metal, there is the problem that the matrix metal becomes excessively heated at the weld beginning point and a drop in the strength of the matrix metal is invited.

CITATION LIST

Patent Literature

PLT 1: Japanese Patent Publication No. 2008-221300A
PLT 2: Japanese Patent Publication No. 09-253843A
PLT 3: Japanese Patent No. 5522317
PLT 4: Japanese Patent Publication No. 2013-031878A
PLT 5: Japanese Patent Publication No. 2014-004609A
PLT 6: Japanese Patent Publication No. 2010-110793A
PLT 7: Japanese Patent Publication No. 2003-341391A
PLT 8: Japanese Utility Model Publication No. 54-100925U
PLT 9: WO2013/157557A
PLT 10: WO2014/084317A

SUMMARY OF INVENTION

Technical Problem

The present invention, in view of the above situation, has as its object the provision of a fillet welded joint and a method of production of the same able to raise the productivity and facilitate application to a part of a complicated shape without sacrificing the strength of the welded structural member against fatigue fracture.

Solution to Problem

As explained above, in chassis members and other welded structural members, due to the structures of the members, there are weld locations which are fillet welded not at the perpendicularly crossing parts of the two sides of abutting parts of two steel members, but at the perpendicularly crossing parts of just one side. Fatigue cracks are expected to easily form at such weld locations. Therefore, the inventors studied the cause of formation of fatigue cracks and means for suppressing the formation of fatigue cracks using as an example a basic lap fillet welded joint.

When fillet welding thin steel sheets for automotive use, from the viewpoint of productivity, sometimes the fillet bead is provided only on one side of the thin steel sheets. This is because since the sheet thickness is small, if fillet welding one side of the perpendicularly crossing parts, that is, the front side of the perpendicularly crossing parts, then immediately fillet welding the back side of the sheets, the steel sheets do not completely cool down, so there is the problem that the steel sheets themselves will be burned through.

Therefore, the inventors conducted fatigue tests covering welded structural members obtained by fillet welding only the perpendicularly crossing parts of one side among the perpendicularly crossing parts formed at the two sides of the abutting parts of two steel members when making at least one of the steel members a thin steel sheet with a sheet thickness of 3.2 mm or less. As a result, they learned that in such a welded structural member, sometimes fatigue cracks form at the root 5 of the fillet bead.

Here, the inventors focused on lap fillet welded joints obtained by fillet arc welding only the perpendicularly crossing parts of one side of the overlapping parts of the steel sheets 1 and 2 shown in FIG. 1A in their study. The inventors used the 3D finite element method to analyze how the steel sheets 1 and 2 deform when a tensile force F1 acts on the fillet bead 3 formed by the fillet arc welding along the upper steel sheet 1 and a tensile force F2 acts along the lower steel sheet 2.

As a result, it was learned that a large bending moment is generated due to deviation of the center axis of the upper steel sheet 1 (single line passing through center of thickness and width of steel sheet and parallel to longitudinal direction of steel sheet) from the center axis of the lower steel sheet 2 and that the lower steel sheet 2 bends near the fillet bead 3 resulting in the root 5 opening. This is considered to be due to the increased stress concentrating at the root 5 and causing the formation of a fatigue crack.

Therefore, the inventors studied, as means for suppressing bending of the lower steel sheet 2, not forming a stiffening bead by a weld bead, but forming it in advance before welding by a press operation.

As a result, as shown in FIG. 2, part of the lower steel sheet 2 is press-formed to form in advance a rib-shaped projection 3A so as to cross or contact a fillet bead 3 (below, such a projection referred to as a "press bead"). The fillet bead 3 is formed by fillet arc welding so that the upwardly projecting end part of the press bead 3A overlaps the fillet bead 3. If doing this, the press bead 3A can function as a member for raising the rigidity of the steel sheet and weld metal with respect to the direction at which the above-mentioned bending moment is applied and suppress bending of the lower steel sheet 2. Therefore, it is possible to suppress the formation of fatigue cracks.

From these results of observation, the following findings were obtained:

(I) It was discovered that by forming a press bead so as to cross or contact a fillet weld bead, it is possible to raise the fatigue strength of fillet welding.

Note that, when arranging the press bead 3A so as to project upward at the fillet bead 3 side, as shown in FIG. 3(*a*), the molten metal at the time of welding to form the fillet bead is blocked by the press bead 3A and a good weld bead shape is obtained. However, if the press bead is arranged to project downward at the fillet bead side, as shown in FIG. 3(b), the molten metal at the time of welding flows out into the downwardly projecting part of the press bead (bottom view at bottom), the thickness of the weld bead falls, and a sufficient weld metal strength cannot be obtained.

In a welded structural member for automotive use, in particular a welded structural member for chassis use, in addition to "lap fillet welding" for simply lap fillet welding one sheet and another sheet such as the above-mentioned test piece, sometimes the edge end of a metal member is fillet welded on the surface of another metal sheet to produce a welded structural member (below, sometimes called "butt fillet welding" or "T-fillet welding"). For such a welded joint as well, it was learned that it is effective to form at least one press bead on the surface of the fillet welded metal sheet so that the press bead projects upward at the side having the fillet bead and part of the press bead overlaps the fillet bead.

(II) Further, it was learned that when applying to a welded structural member to which a load from the outside is directly applied a repeated load envisioned as being applied to the welded structural member, it is effective to form a press bead at the region where the fatigue crack first forms. The location where the fatigue crack first forms corresponds to the location of maximum main stress. At this time, if the direction of maximum main stress can also be learned in advance, the press bead should be formed so as to run along the direction of maximum main stress. That is, the longitudinal direction of the press bead should become the direction of maximum main stress.

Note that, regarding the stress concentration at the weld bead, in most cases stress concentrates at the weld toe where the rate of change of shape is high and the vertical direction at the weld toe becomes the direction of maximum main stress. For this reason, arranging the press bead in the direction perpendicular to the outer edge end of the weld bead forming the boundary of the weld bead and matrix metal (below, referred to as the "weld toe line") is effective for improvement of the fatigue strength. The toe line direction of the weld bead here is defined as follows: That is, this means (a) for a straight fillet bead, the literal weld line direction (solid line arrow direction of FIG. 4(a)), (b) for a curved fillet bead, the tangential direction of the fillet bead (solid line arrow direction of FIG. 4(b)), (c) for the vicinity of the beginning portion and ending portion of the fillet bead (below, abbreviated as "beginning and ending portions") (however, excluding the front end), the tangential direction of the toe of the fillet bead (solid line arrow direction in FIG. 4(c)), and (d) at the front ends of the beginning and ending portions of the fillet bead, the tangential direction of the toe of the front end of the bead, that is, the direction perpendicular to the weld line (solid line arrow direction in FIG. 4(d)).

The present invention was made based on the above discoveries and has as its gist the following:

The fillet welded joint of the present invention is a fillet welded joint formed by fillet welding at least two metal members, wherein on the surface of at least one of the metal members, the fillet welded joint comprises a press bead of a rib-shaped projection provided by press-forming so as to project upward to a side having a weld bead formed by the fillet welding, and wherein part of the press bead contacts or overlaps the weld bead.

Further, in another example of the fillet welded joint of the present invention, an angle formed by a longitudinal direction of the press bead and a direction of a weld toe line of the weld bead may be 45° to 135°.

Further, in another example of the fillet welded joint of the present invention, the joint may have a press bead positioned along the weld bead at least at one of a beginning portion, ending portion, and bent portion of the weld bead and location in the middle of that weld bead where a stress higher than stresses at the beginning and ending portions is applied.

Further, in another example of the fillet welded joint of the present invention, the joint may have a press bead having a toe radius Ra (mm) which is equal to or longer than a thickness "t" (mm) of the metal member having the press bead.

Further, in another example of the fillet welded joint of the present invention, the press bead may satisfy La≥2W, Ha≥t, and Wa≥W where "La" expresses a length in a longitudinal direction of the press bead, "Ha" expresses a height of the press bead, "Wa" expresses a width of the press bead, "W" expresses a width of the weld bead, and "t" expresses a thickness of the metal member having a press bead.

Further, the press bead may be formed so as to cross the weld bead.

Further, the press bead may be formed to overlap the weld bead at the part where a previously established maximum main stress is caused.

Further, in another example of the fillet welded joint of the present invention, the metal member welded with the metal member at which the press bead is formed may comprise a notched part fitting in the press bead at the location where the press bead is welded.

Further, in another example of the fillet welded joint of the present invention, at least one of the metal members may be a metal member of a cross-sectional shape which has a folded corner part and which is fillet welded to the other metal member and a press bead may be superposed at the corner part of the weld bead formed.

Further, the method of forming a fillet welded joint of the present invention is a method for producing a fillet welded joint by fillet welding at least two metal members, the method comprising press-forming on the surface of at least one of the metal members a press bead of a rib-shaped projection so as to project upward to the side having a weld bead formed by the fillet welding and fillet welding the metal members so that a part of the press bead contacts or is superposed with the weld bead.

Further, the effect of the press bead increases by forming the press bead so that the angle formed by a longitudinal direction of the press bead and a direction of a weld toe line of the weld bead becomes 45° to 135°.

Further, in another method for forming the fillet welded joint of the present invention, the method may further comprise forming the press bead positioned along the weld bead at least at one of a beginning portion, ending portion, and bent portion of the weld bead and location in the middle of the weld bead where a stress higher than stresses at the beginning and ending portions is applied.

Further, in another method for forming the fillet welded joint of the present invention, the method may further may comprise forming a press bead having a toe radius Ra (mm) which is equal to or more than a thickness "t" (mm) of the metal member having the press bead.

Further, it is also possible to form the press bead so as to satisfy La≥2W, Ha≥t, and Wa≥W, wherein "La" expresses a length in a longitudinal direction of the press bead, "Ha" expresses the height of the press bead, "Wa" expresses the width of the press bead, "W" expresses the width of the weld bead, and "t" expresses the thickness of the metal member having the press bead.

Further, the press bead may be formed to cross the weld bead.

Further, the method may further comprise forming the press bead so as to overlap with the weld bead at a part where a previously established maximum main stress is caused.

Further, in another method for forming the fillet welded joint of the present invention, the method may further comprise forming a notched part, the notched part being fit into in the press bead at the location welded with the press bead in the metal member welded with the metal member at which the press bead is formed.

Further, in another method for forming the fillet welded joint of the present invention, the method may further comprise fillet welding one of the metal members to the other metal member, at least one of the metal members being a metal member of a cross-sectional shape having a folded corner part, and forming the press bead in advance at the other metal member so that the press bead is superposed at the corner part of the weld bead.

Advantageous Effects of Invention

According to the present invention, no stiffening bead is further formed after forming the weld bead. For this reason, application to parts of complicated shapes is easy and the welding process is streamlined so productivity can be improved. Further, the problem of the drop in strength due to welding over a weld bead can be resolved. Further, even an extremely narrow location which a welding torch would have a hard time reaching can be reinforced by a press bead according to the present invention. Further, unlike a weld bead, a press bead can be freely set in height and toe radius, so a sufficient improvement of rigidity can be obtained. It is therefore possible to prevent fatigue cracks from forming from the stiffening press bead itself.

BRIEF DESCRIPTION OF DRAWINGS

FIG. 3(a) is a cross-sectional view showing the state of arranging a press bead to project upward to the fillet bead side, while FIG. 3(b) is a cross-sectional view showing the state of arranging a press bead to project upward to the fillet bead side.

FIG. 7(a) is a top view of a welded joint of the present invention formed by a lap fillet bead having a bent portion at the fillet bead, while FIG. 7(b) is a perspective view of a butt fillet joint of the present invention of a structure where a press bead is arranged so as to contact the fillet bead at a corner part of a bracket member.

FIG. 12(a) is a cross-sectional view when cutting the weld bead at a cross-section vertical to a length direction of the weld bead, while FIG. 12(b) is a cross-sectional view when cutting the press bead at a cross-section vertical to a length direction of the press bead.

FIG. 16(a) is a graph showing the results of fatigue tests conducted using the lap fillet welded joints shown in FIGS. 5(a), (b), (e), (f), and (g), while FIG. 16(b) is a top view of a lap fillet welded joint as a comparative example used for the fatigue test of FIG. 16(a).

DESCRIPTION OF EMBODIMENTS

First, the basic matters in the fillet welded joint and method of production of the same of the present invention will be explained in detail using the drawings. Below, the present invention will be explained using mainly a fillet welded joint, but the fillet welded joint and method of production of the same of the present invention is not limited to a welded structural member for automotive use and can also be utilized for a structure comprised of several materials or members etc. such as rolling stock or aircraft or other transport machinery, mechanical structures, home electric appliances, etc. Further, the present invention is not limited to steel sheets and can also be applied to iron sheets, aluminum sheets, titanium alloy sheets, and sheet materials containing a metal and resin.

(Cross-Sectional Shape of Press Bead)

As explained above, the present invention is characterized by press-forming a metal member used for a fillet welded joint so as project upward at the side having a fillet bead to form in advance a rib-shaped projection at the surface of the metal member. In the present invention, the rib-shaped projection is called a "press bead". The cross-sectional shape vertical to the direction of formation of the press bead is not particularly limited so long as it can be press-formed. A polygonal shape, semi-elliptical shape, semi-circular shape, and various other shapes can be applied. Further, the cross-sectional shape parallel to the direction of formation of the press bead is not particularly limited so long as one able to be press-formed.

(Mode of Arrangement of Press Bead in Case of Lap Fillet Bead)

As explained above, the present invention is characterized by forming a press bead in advance at one part of a lower steel sheet so as to cross or contact a fillet bead and by performing fillet welding to form the fillet bead so that the upwardly projecting side end part of the press bead is superposed over the fillet bead.

Figure 5:
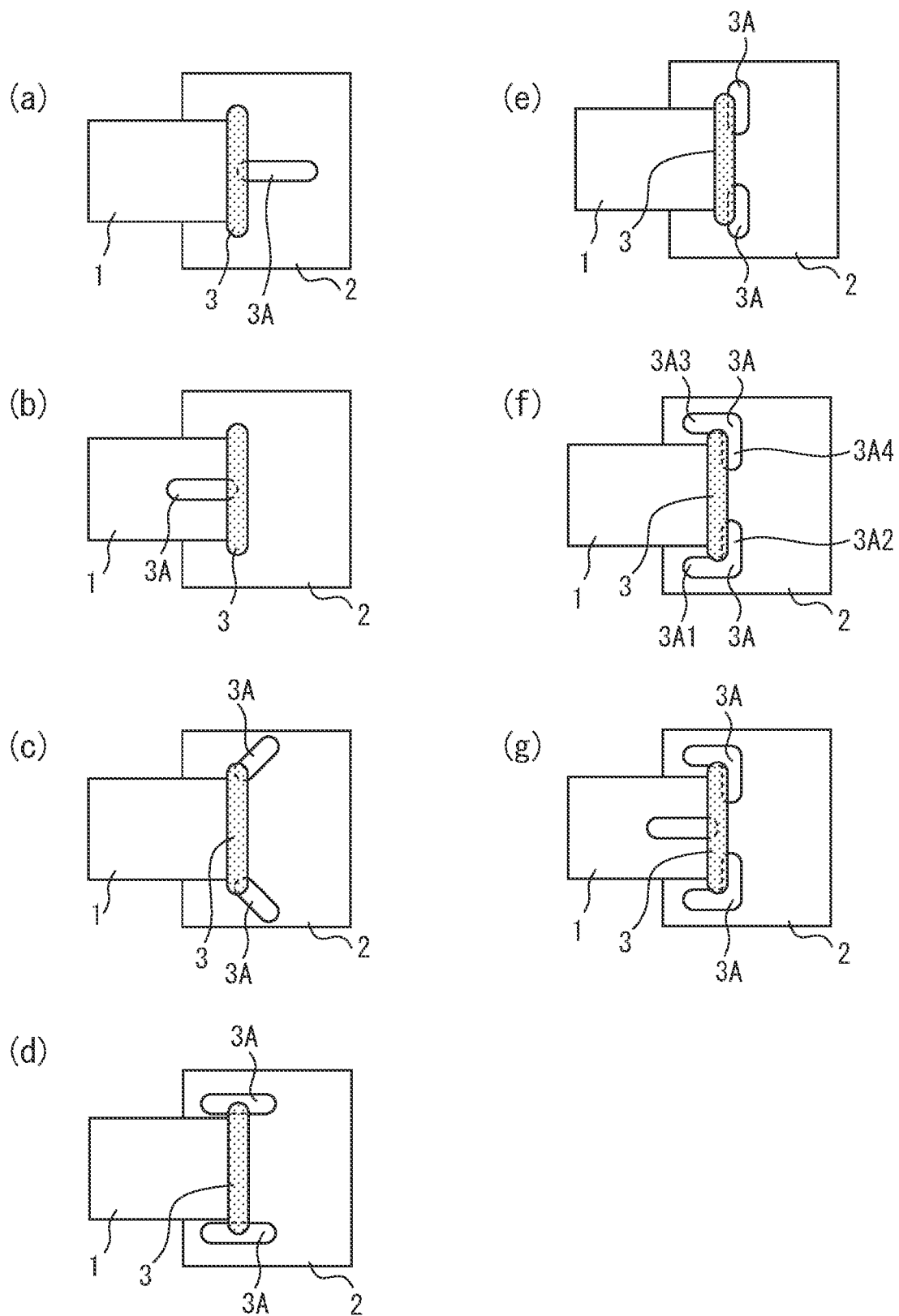
FIG. 5(a) is a top view showing an example of arrangement of an upwardly projecting press bead at a lower steel sheet so as to contact the vicinity of the center part of the fillet bead.
FIG. 5(b) is a top view showing an example of arrangement of an upwardly projecting press bead at an upper steel sheet so as to contact the vicinity of the center part of the fillet bead.
FIGS. 5(c) to (f) are top views showing examples of arrangement of upwardly projecting press beads at lower steel sheets so as to contact beginning and ending portions of the fillet beads.
FIG. 5(g) is a top view showing an example of combination of the modes of arrangement of press beads shown in FIGS. 5(b) and (f).

In the case of a lap fillet bead, as shown in FIG. 5(a), it is also possible to arrange an upward projecting press bead at the lower steel sheet so as to contact the vicinity of the center part of the fillet bead. In the case of the mode of arrangement of the press bead shown in FIG. 5(a), rotational deformation of the lower steel sheet is suppressed and it is possible to suppress cracks from the toe of the fillet bead.

Further, as shown in FIG. 5(b), it is possible to arrange an upwardly projecting press bead at an upper steel sheet so as to contact the vicinity of the center part of the fillet bead. In the case of the mode of arrangement of the press bead shown in FIG. 5(b), rotational deformation of the upper steel sheet is suppressed, so in particular it is possible to suppress cracks from the root of the fillet bead.

Further, as shown in FIGS. 5(c) to (f), it is also possible to arrange upwardly projecting press beads extending longer from the fillet bead toe at the lower steel sheet so as to contact the beginning and ending portions of the fillet bead. In particular, by forming press beads at least 10 mm extending longer than the toe of a fillet bead, there is the effect of raising the rigidity of the beginning and ending portions of the fillet bead and cracks from the beginning and ending portions can be suppressed. The press beads shown in FIGS. 5(c), (d), and (f) are formed at the beginning portions and ending portions of the weld beads so that the angles formed by the longitudinal directions and weld toe lines of the weld beads become 45° to 135°. The press beads shown in FIG. 5(e) are formed at the beginning portion and ending portion of the weld bead so that their longitudinal directions become parallel to the direction of the weld toe line of the weld bead. When the lower steel sheet is narrow in width and it is difficult to arrange a long press bead such as in FIG. 5(a), the modes of arrangement of the press beads shown in FIGS. 5(c) to (f) would be effective.

Furthermore, the mode of arrangement may be two or more of the modes of arrangement explained above shown in FIGS. 5(a) to (f) combined. In each of the above-mentioned modes of arrangement, the press bead has the effect of improving the rigidity of the welded joint formed by the lap fillet bead. That is, the press bead suppresses rotational deformation in the sheet thickness direction when applying a tensile load to the top and bottom steel sheets and reduces the stress concentration acting on the fillet bead to thereby act effectively to improve the fatigue life. For example, it is also possible to combine the modes of arrangement of the press beads shown in FIGS. 5(b) and (f) to produce the welded joint shown in FIG. 5(g). According to the mode of arrangement of the press beads shown in FIG. 5(g), it is possible to synergistically obtain the effect of suppression of cracks from the root and the effect of suppression of cracks from the beginning portion and ending portion of the weld bead.

(Verification of Effect of Improvement of Fatigue Life Due to Mode of Arrangement of Press Beads)

To investigate the effect of improvement of the fatigue life due to the mode of arrangement of press beads, the lap fillet welded joints shown in FIGS. 5(a), (b), (e), (f), and (g) were used to conduct fatigue tests. Further, for comparison with the mode of arrangement of the press beads according to the present invention, a lap fillet welded joint at which a press bead of an equal length to the fillet bead was formed along the fillet bead (shown in FIG. 16(b)) and a lap fillet welded joint at which no press bead or other stiffening bead was formed were used to conduct fatigue tests.

The different forms of the lap fillet welded joints used in the fatigue tests were produced by forming press beads in advance at a sheet thickness 2.6 mm 780 MPa class steel sheet, overlaying on it a sheet thickness 3.2 mm 780 MPa class steel sheet, and fillet welding them. Further, in the different forms of the lap fillet welded joints, the press beads were formed to heights of Ha'=1 and toe radii of ρ'=1. Here, Ha' and ρ' show the values of the weld bead height (Hb)/sheet thickness (t) and toe radius (Rb)/sheet thickness (t) respectively.

Figure 16:
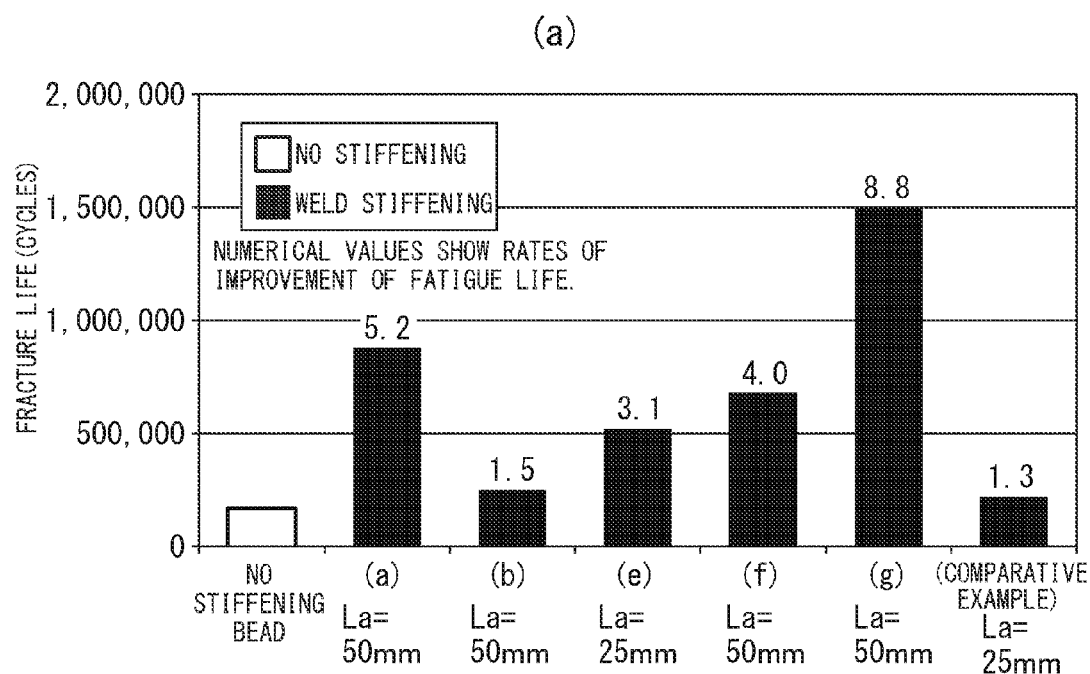
Figure 16:
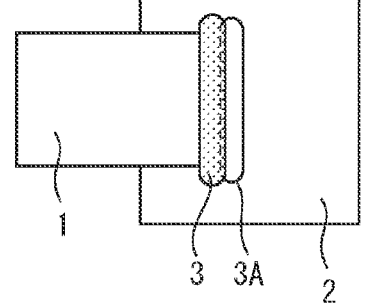

Further, the press beads of FIGS. 5(a), (b), (f), and (g) were formed so that the lengths became La=50 mm, while the press beads of FIG. 5(e) and FIG. 16(b) were formed so that the lengths became La=25 mm.

The fatigue tests used a universal axial force fatigue tester to cause a repeated load to act so that a minimum load of 1 kN and a maximum load of 11 kN were applied in opposite directions on the upper sheet 1 and lower sheet 2 (in the same way as the later explained FIG. 15, the arrow directions shown in FIG. 15).

The results of the fatigue strength tests are shown in FIG. 16(a). In the case of a lap fillet welded joint not having a stiffening bead, the fracture life was 170,000 cycles after which cracks formed from the weld beginning and ending portions. In the case of the lap fillet welded joint shown in FIG. 5(a), the fracture life increased 5.2-fold and the crack formation position became the root of the fillet bead. In the case of the lap fillet welded joint shown in FIG. 5(b), the fracture life increased 1.5-fold, but the rate of increase was small. With the lap fillet welded joint shown in FIG. 5(b), it is believed that the effect of suppression of rotational deformation of the lower sheet cannot be expected and cracks formed from the toes of the beginning and ending portions of the fillet bead, so the effect of extension of the fatigue life was small.

The fatigue lives of the lap fillet welded joints of FIGS. 5(e) and (f) respectively increased 3.1-fold and 4.0-fold, but if compared with the lap fillet welded joint shown in FIG. 5(a), the effect of extension of the fatigue life was small. The part where the crack forms was the root of the fillet bead. The effect of suppression of cracks at the toes of the beginning and ending portions of the fillet bead was obtained, but it is believed that the lap fillet welded joints of FIGS. 5(e) and (f) had smaller effects of suppression of deformation of the root compared with the lap fillet welded joint shown in FIG. 5(a).

The lap fillet welded joint of FIG. 5(g) obtained a large effect of extension of the fatigue life. This is believed to be due to the fact that the effect of suppression of cracks at the beginning and ending portions of the fillet bead due to the press bead shown in FIG. 5(f) and the effect of suppression of deformation of the root due to the press bead shown in FIG. 5(b) act as synergistic effects.

In the case of the lap fillet welded joint shown in FIG. 16(b) as a comparative example, the effect of extension of the fatigue life was small. This is because even if arranging a press bead parallel to the fillet bead, the effect of suppression of rotational deformation of the lower sheet was not exhibited and cracks at the beginning and ending portions of the fillet bead could not be suppressed.

(Mode of Arrangement of Press Beads in Case of Butt Fillet Joint)

Figure 6A:
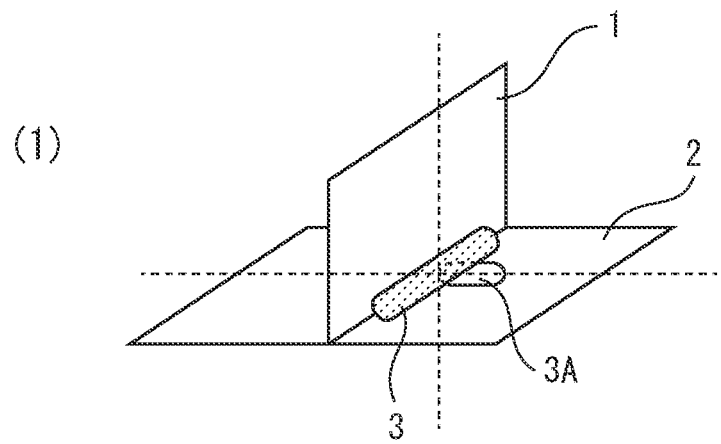
FIG. 6A(1) is a perspective view of one example of a butt fillet joint of the present invention in the case of arranging an upwardly projecting press bead at a lower steel sheet so as to contact the vicinity of the center part of the fillet bead, while FIG. 6A(2) is a cross-sectional view of FIG. 6A(1).
Figure 6A:
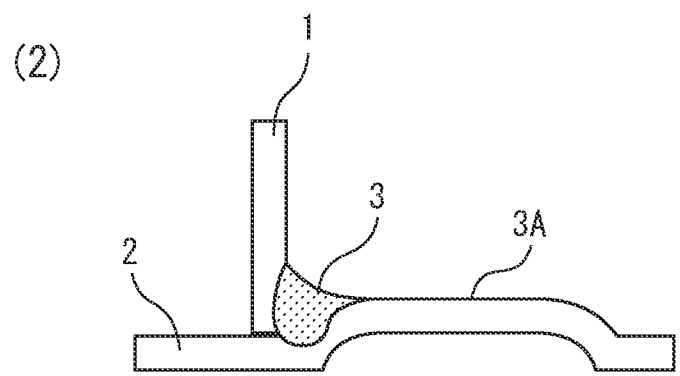
Figure 6B:
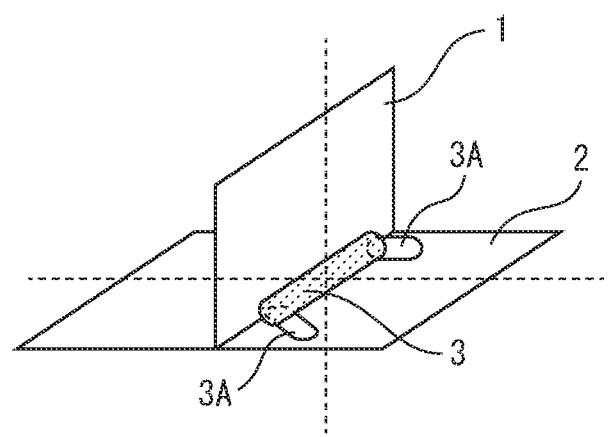
FIG. 6B is a perspective view of one example of a butt fillet joint of the present invention in the case of arranging upwardly projecting press beads at a lower steel sheet at beginning and ending portions of the fillet bead so as to contact the beginning and ending portions of a fillet bead.

On the other hand, in the case of a T-fillet joint (butt fillet joint), it is necessary to consider the issue of the fact that cracks easily form from the lower steel sheet. As a mode of arrangement considering such an issue, as shown in FIG. 6A(1), it is also possible to arrange an upwardly projecting press bead 3A at the lower steel sheet 2 so as to contact the vicinity of the center part of the fillet bead 3. Further, as shown in FIG. 6B, it is also possible to arrange upwardly projecting press beads 3A at the beginning and ending portions of the fillet bead 3 in the lower steel sheet 2 so as to contact the beginning and ending portions of the fillet bead 3. Alternatively, as shown in FIG. 6C(1), it is also possible to provide a notch 1A in advance at the upper steel sheet 1, arrange the upper steel sheet 1 so that the notch 1A fits over the press bead 3A, and arrange the upwardly projecting press bead 3A at the lower steel sheet 2 so that the fillet bead 3 and the press bead 3A cross.

Figure 6C:
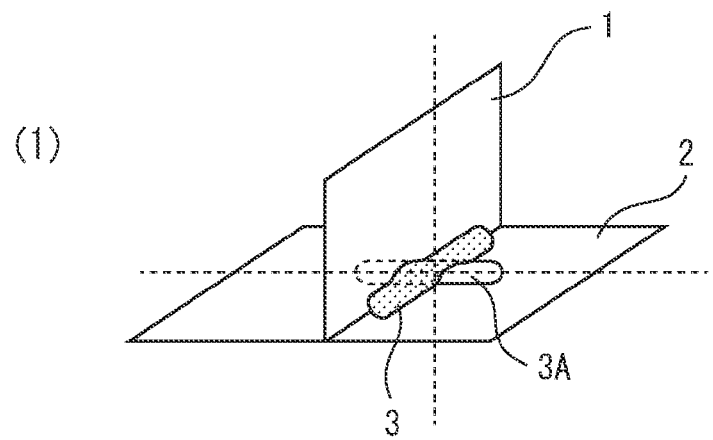
FIG. 6C(1) is a perspective view of one example of a butt fillet joint of the present invention in the case of providing a notch in the upper steel sheet in advance and fitting the notch over the press bead, while FIG. 6C(2) is a cross-sectional view of FIG. 6C(1).
Figure 6C:
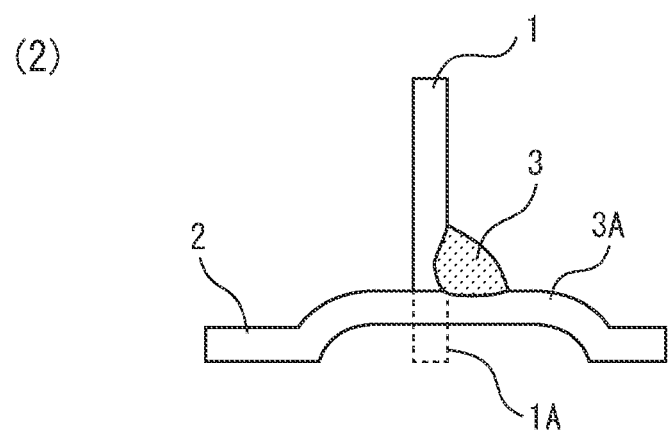
Figure 6D:
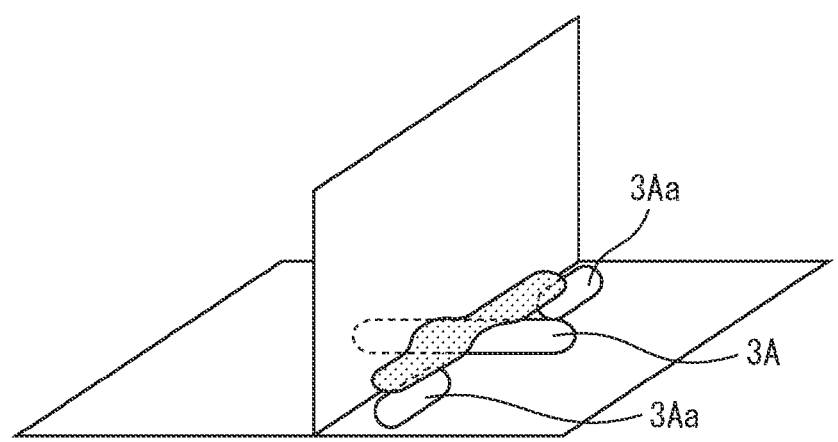
FIG. 6D is a perspective view of one example of a butt fillet joint of the present invention in the case of arranging at the lower steel sheet of a T-fillet joint an upwardly projecting press bead at a lower steel sheet in parallel with a fillet bead so as to contact the beginning and ending portions of the fillet bead.

Furthermore, a mode of arrangement combining two or more of the above modes of arrangement shown in FIG. 6A to FIG. 6C is also possible. It is also possible to combine the modes of arrangement shown in FIGS. 5(a) and (c) to (f) where press beads are formed at the lower steel sheets with the above-mentioned mode of arrangement shown in FIG. 6A. For example, the T-fillet joint shown in FIG. 6D may be comprised of the lower steel sheet 2 of the T-fillet joint shown in FIGS. 6C(1) and (2) where, as shown in FIG. 5(e), upwardly projecting press beads 3Aa are arranged in parallel with the fillet bead 3 so as to contact the beginning and ending portions of the fillet bead 3.

In all of the modes of arrangement explained above, the press bead has the effect of improving the rigidity of the butt fillet joint. FIG. 6A(2) is a cross-sectional view as seen from the plane passing through the centerline of the upper steel sheet 1 and lower steel sheet 2 of FIG. 6A(1). Further, FIG. 6C(2) is a cross-sectional view as seen from the plane passing through the centerline of the upper steel sheet 1 and lower steel sheet 2 of FIG. 6C(1). As shown in these cross-sectional views, when applying a tensile load to the upper and lower steel sheets, the press bead suppresses out-of-plane deformation of the lower steel sheet. Therefore, the press bead is effective for improving the fatigue life due to the effect of improving the rigidity by suppressing rotational deformation in the direction of sheet thickness and reducing the stress concentration acting on the fillet bead when applying a tensile load to the upper and lower steel sheets.

Figure 7:
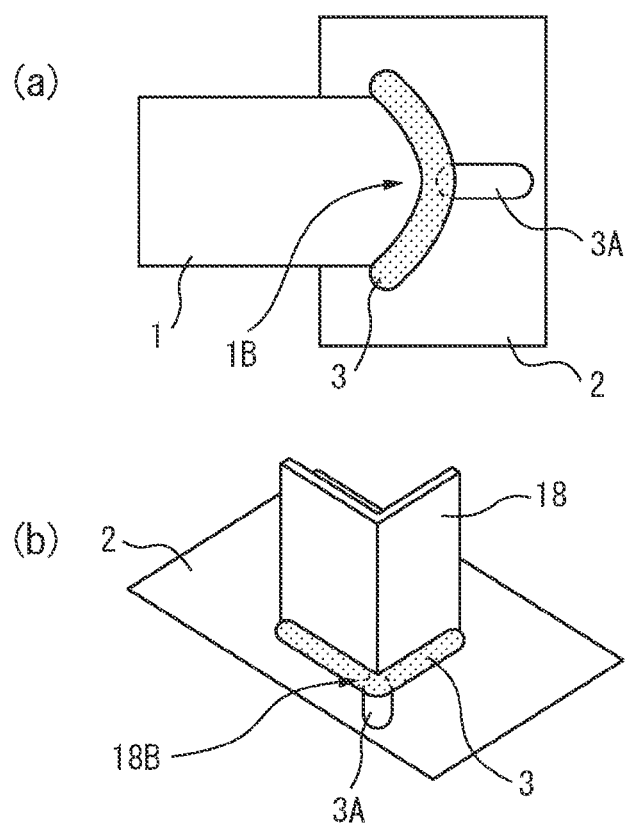

Further, the press bead of the present invention can be applied to not only the straight part of a weld bead, but also the welded part where the direction of the weld toe line changes (below, referred to as a "bent portion"). For example, when the weld bead is formed in an L-shape, V-shape, or U-shape, the weld toe line of the weld bead includes two directions. When the fillet bead has that bent portion, stress easily concentrates at that bent portion, so arranging the press bead at the bent portion is effective for improving the fatigue strength. FIG. 7(a) is a top view of a welded joint of the present invention formed by a lap fillet bead having a bent portion 1B at the fillet bead 3. FIG. 7(b) is a perspective view of a butt fillet joint of the present invention of a structure where a press bead 3A is arranged so as to contact the fillet bead 3 at a corner part 18B of the bracket member 18. As shown in FIG. 7(a) and FIG. 7(b), the press bead has to be formed so as to cross the fillet bead at the bent portion or be superposed with the fillet bead at its end part. This is because if formed separated from the fillet bead, it does not sufficiently function as a member raising the rigidity of the steel sheet.

Above, the suitable arrangement of the press bead was explained with reference to the examples of various types of welded joints, but, since actual welded joints are configured by large numbers of members, a plurality of weld lines may be arranged in close proximity. Therefore, using the same press bead in common for two independent fillet beads, it is also possible to arrange the press bead so as to be superposed with one fillet bead at beginning point thereof (one of the end parts) and to be superposed with the other fillet bead at ending point thereof (other end part). That is, press bead may be formed so that either of the end parts is superposed on either of the two independent fillet beads.

If the crack formation position of the welded joint is anticipated in advance, it is effective to arrange the press bead in the direction of maximum main stress at the location of crack formation. The direction of main stress is generally a direction vertical to the weld toe line in many cases. Note that, when the location of crack formation cannot be predicted by experiments, for example, FEM stress analysis utilizing 3D CAD may be used to find the part of stress concentration from the distribution of stress at the time a load is applied to the welded structural member and thereby obtain a grasp of the location of crack formation. Further, to grasp the same, it is also possible to use an actual welded structural member to run a stress load test and use a strain gauge etc. at that time to investigate the distribution of strain.

(Length of Press Bead)

The press bead may be formed so as to be straight seen from a top view or may be formed so that the press bead is comprised of a plurality of straight parts seen from a top view, but the length of the press bead (La) preferably satisfies the condition of the following (A):

Length of press bead $(La) \geq$ Width of fillet bead $(W) \times 2$      (A)

Further, as shown by 3A1 and 3A2 (or 3A3 and 3A4) of the press bead 3A of FIG. 5(f), when a single press bead is formed by a plurality of straight protruding parts, it is preferable that the straight protruding parts respectively have lengths satisfying the above condition of (A).

When the length of the press bead is short, it is not possible to sufficiently raise the rigidity of the steel members and not possible to obtain the function of improving the fatigue strength of the welded joint. If the length of the press bead sticking out from the fillet bead is the width of the fillet bead or more, depending on the extent of the load applied to the welded structural member, it is possible to obtain the function of improving the fatigue strength, but to further raise the rigidity, it is preferable to make the length of the press bead (La) two times or more the width of the fillet bead (W).

Further, the upper limit of the length of the press bead is restricted by the shape and structure of the steel product produced by the welding. For example, if the length of the fillet bead is "L", the length of the press bead (La) can be made less than 0.5×L.

(Height of Press Bead)

As explained above, the cross-sectional shape parallel to the direction of formation of the press bead is not particularly limited, but the height in one press bead need not be constant. However, the height (Ha) of the press bead from the surface of the steel member preferably satisfies the condition of the following (B) with respect to the thickness (t (mm)) of the steel member at which the press bead is formed.

Height of press bead $(Ha) \geq$ Thickness of steel member $(t)$      (B)

If the height of the press bead is less than the thickness of the steel member at which the press bead is formed, the press bead will not sufficiently exert its function.

To obtain the effect of improvement of the rigidity of the weld zone, the higher the height of the stiffening bead, the better. However, if trying to raise the bead height by the weld bead, the input heat becomes excessive and the weld zone ends up with burn-through defects. If setting the welding voltage low to prevent burn-through defects, the shape of the weld toe becomes sharp and ends up causing the formation of fatigue cracks.

On the other hand, to reduce the stress concentration at the weld toe, it is necessary to increase the flank angle of the toe, that is, make the toe angle θ smaller. For this reason, to obtain the effect of improving the rigidity of the weld zone, it is necessary to make the stiffening bead higher and reduce the toe angle θ.

Figure 12:
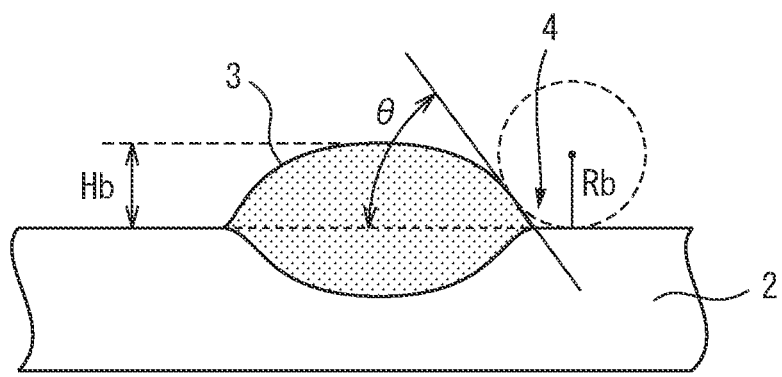
Figure 12:
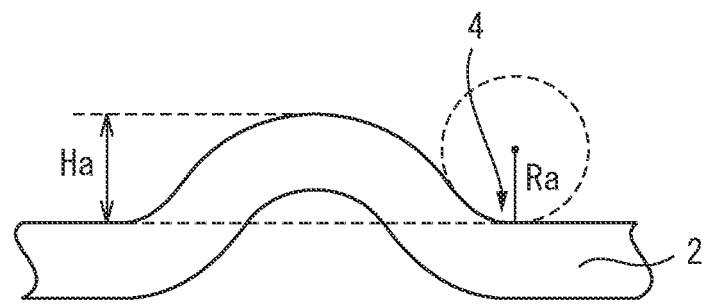
Figure 13:
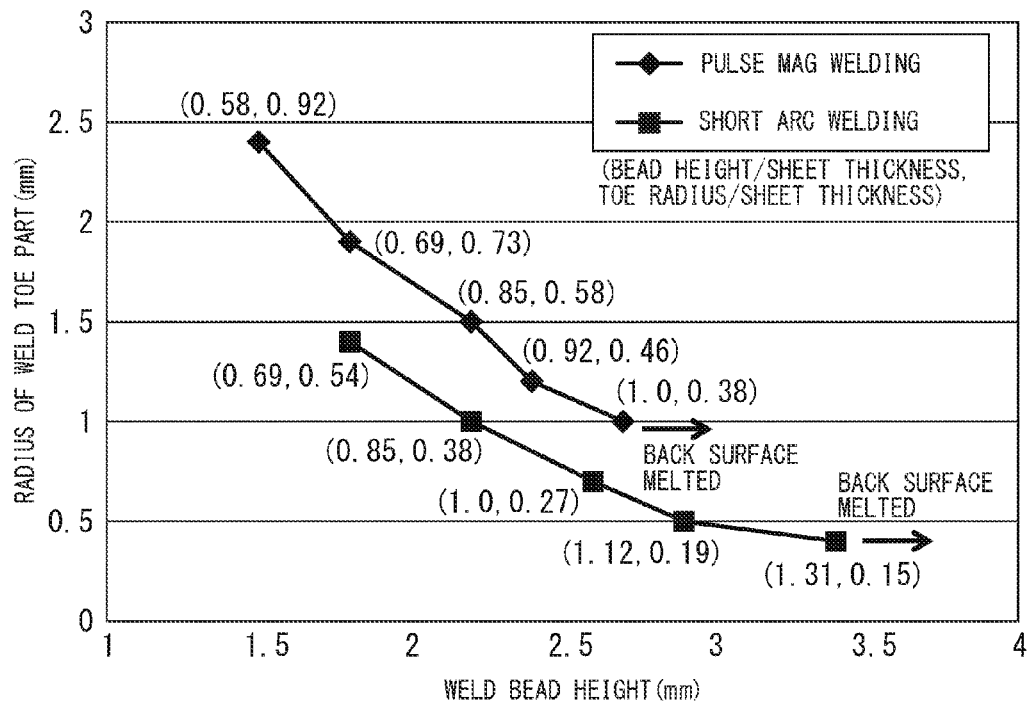
FIG. 13 is a graph showing the relationship with the radius of curvature of the fillet bead at the weld toe of the weld bead shown in FIG. 12.

Therefore, the inventors formed a 50 mm length weld bead on the surface of a sheet thickness 2.6 mm steel sheet and investigated the relationship between the weld bead height and shape of the weld toe. The welding conditions were made those of pulse mag welding generally used in welding thin sheets (welding current=115 A, welding voltage=22V) and those of short arc welding (welding current=115 A, welding voltage=18V). The welding speed was made to change to 30 to 100 cm/min to make the weld bead height change. Note that, in the conventional patent literature, the flank angle was used as an indicator of the toe shape, but in the findings of the inventors, it is believed that the toe radius is more suitable as an indicator showing the coefficient of stress concentration than the flank angle or toe angle θ, so the toe radius was made the indicator of the shape of the toe. Here, the toe radius of the weld bead, as shown in FIG. 12(a), is the radius of curvature Rb of the fillet bead 3 at the weld toe 4. The results are shown in the graph of FIG. 13.

In both pulse mag welding and short arc welding, if lowering the welding speed and raising the bead height (Hb), the toe radius (Rb) tends to become smaller. Further, in both pulse mag welding and short arc welding, if lowering the welding speed and raising the bead height (Hb), it is feared that the back surface of the steel sheet will end up melting and part of the weld bead will burn through. As shown above, it will be understood that realizing both expansion of the toe radius and increase of the weld bead height at the weld bead would be difficult. In particular, in the case of pulse mag welding, it is difficult to stably make the toe radius over 1.0 mm.

The numerical values in parentheses show the values of the weld bead height (Hb)/sheet thickness (t) and the toe radius (Rb)/sheet thickness (t), but the maximum value of the weld bead height was about the sheet thickness in pulse mag welding or about 1.3-fold the sheet thickness in short arc welding. Further, the maximum value of the toe radius was about 0.92-fold and 0.54-fold the sheet thickness in the respective welding methods.

A bead prepared by press-forming differs from a weld bead in the point that it is not restricted in bead shape along with welding. For this reason, a press bead can achieve both enlargement of the toe radius and increase of the bead height and further is easy to change in width dimension, so an effect of improvement of the fatigue strength over a weld stiffening bead can be expected. Here, the "toe radius of the press bead" is the radius of curvature Ra of the root of the press bead as shown in FIG. 12(b).

Therefore, a lap fillet welded joint with a weld bead formed as a stiffening bead and a lap fillet welded joint with a press bead formed as a stiffening bead were used to perform fatigue strength tests. The effects of improvement of the fatigue strength were compared.

Figure 15:
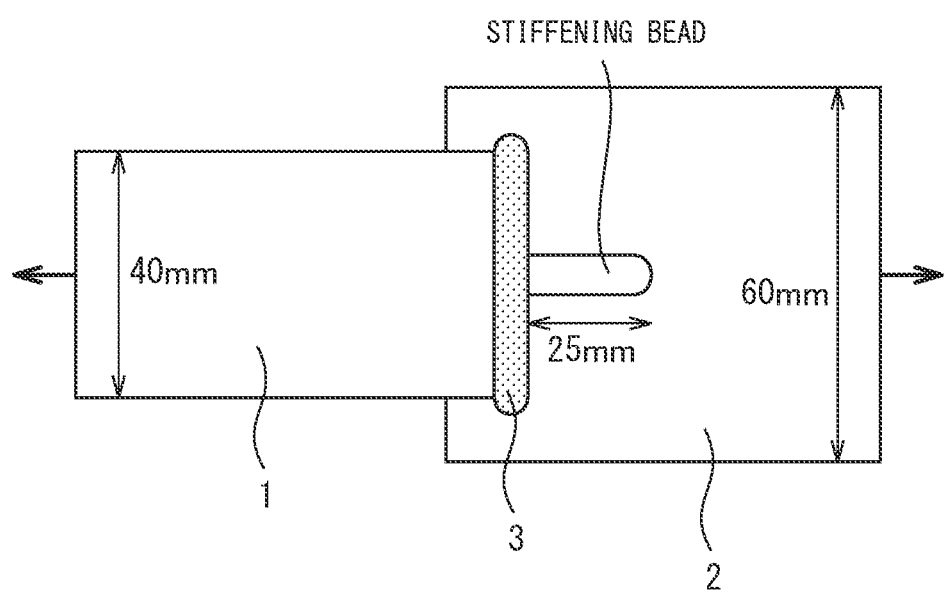
FIG. 15 is a top view of a lap fillet welded joint used for the fatigue strength test of FIG. 14.

The lap fillet welded joint used for the tests is shown in FIG. 15. The lap fillet welded joint is comprised of a sheet thickness 2.6 mm 780 MPa class steel sheet on which a sheet thickness 3.2 mm 780 MPa class steel sheet is laid and fillet welded and has a stiffening bead arranged at the center of the fillet weld bead in a direction vertical to the weld line.

Figure 14:
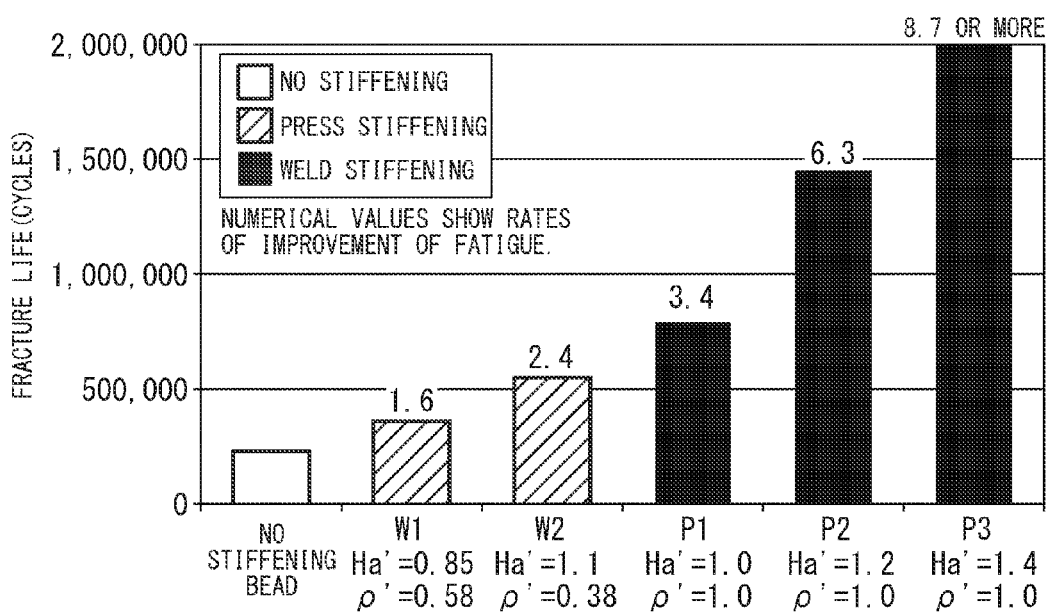
FIG. 14 is a graph showing the results of a fatigue strength test performed using a lap fillet welded joint with no stiffening bead, a lap fillet welded joint formed with a stiffening bead comprised of a weld bead, and a lap fillet welded joint formed with a stiffening bead comprised of a press bead.

The fatigue test uses a universal axial force fatigue tester to cause a repeated load to act so that a minimum load of 0.9 kN and a maximum load of 9.9 kN are applied in opposite directions on the upper sheet 1 and lower sheet 2 of FIG. 15 (in arrow directions of FIG. 15). The results of this fatigue strength test are shown in FIG. 14. As test piece conditions, the Ha' and ρ' shown in FIG. 14 are values obtained by dividing the stiffening bead height and toe radius of the stiffening bead by the sheet thickness (t).

In the case of no stiffening bead, the fracture life was 230,000 cycles after which cracks formed from the weld beginning and ending portions. If a weld stiffening bead was formed as the stiffening bead, the fracture life increased 1.6-fold and 2.4-fold in accordance with an increase in the stiffening bead height. The fatigue cracks formed not only at the welding beginning and ending portions, but also from the stiffening bead ends. On the other hand, if the stiffening bead is a press bead, the fatigue life greatly increased in accordance with the increase in the stiffening bead height. The toe radius of the press bead was enlarged to equal the sheet thickness ($\rho'=1$), so cracks no longer formed from the end parts of the press bead and, it is believed, an effect of improvement of the fatigue life corresponding to an increase in the bead height could be obtained.

According to the above results of study, to obtain an effect of extension of the fatigue life above a weld bead by a press bead, it is preferable to make $Ha' \geq 1$, $\rho' \geq 1$.

(Width of Press Bead)

Further, the width of the press bead (Wa) is preferably one satisfying the condition of the following (C):

$$\text{Width of press bead } (Wa) \geq \text{Width of fillet bead } (W) \quad (C)$$

As explained above, the cross-sectional shape vertical to the direction of formation of the press bead is not particularly limited, but if the width of the press bead is less than the width of fillet bead, the function as a press bead is not sufficiently obtained. No upper limit of the width of the press bead is particularly set so long as the fatigue strength sought for the welded structural member can be secured and the function of the final product is not impaired, but to improve the local rigidity by the press bead, it is preferable to make it 3-fold the weld bead width or less.

(Angle of Direction of Formation of Press Bead)

The angle ($\gamma$) of the direction of formation of the press bead is preferably made one satisfying the condition of the following (D):

$$45° \leq \text{Angle of press bead } (\gamma) \leq 135° \quad (D)$$

To enable the press bead to exhibit the function of raising the rigidity of the steel sheet and suppressing bending, it is preferable to arrange the press bead in the direction of maximum main stress at the location of formation of a crack. The direction of the maximum main stress is in many cases a direction vertical to the weld toe line, so the crossing angle $\gamma$ of the toe line direction of the fillet weld bead and the press bead is preferably 45 to 135°. If the angle $\gamma$ is less than 45° or over 135°, the function of the press bead in improving the rigidity falls. Note that, when the design direction of maximum stress is known, it may be formed so that the longitudinal direction of the press bead matches with that direction. The more preferable angle of the cross angle $\gamma$ of the press bead is 60° to 120°, particularly preferably 80° to 100°.

(Other Requirements)

The conditions for formation of the press bead, the arc welding conditions when forming the fillet bead, and the composition of the welding wire may be ones based on ordinary methods and are not limited to any particular ones. Further, in the welded joint, since the press bead is formed to overlay the fillet bead, it is necessary that there be a region around the welded joint where the press bead can be formed at a required angle and required length, height, and width.

In the above way, in the present invention, even when the welded structural member is subjected to repeated stress, the simple means of providing a press bead enables occurrence of fatigue fracture to be remarkably suppressed.

Further, the inventors confirmed that the technique of the present invention can be applied even to metal members other than steel members. For example, instead of steel members, the technique of the present invention can also be applied to aluminum members or stainless steel members. Further, the inventors confirmed that the technique of the present invention can also be applied to different types of metal members.

Below, specific embodiments in the case of application of a press bead to a fillet welded joint will be explained using the welded structural member shown in FIGS. 8 to 10. Note that, in these embodiments, it is assumed that a repeated load is applied in the white arrow directions shown in the figures.

First Embodiment

Figure 8:
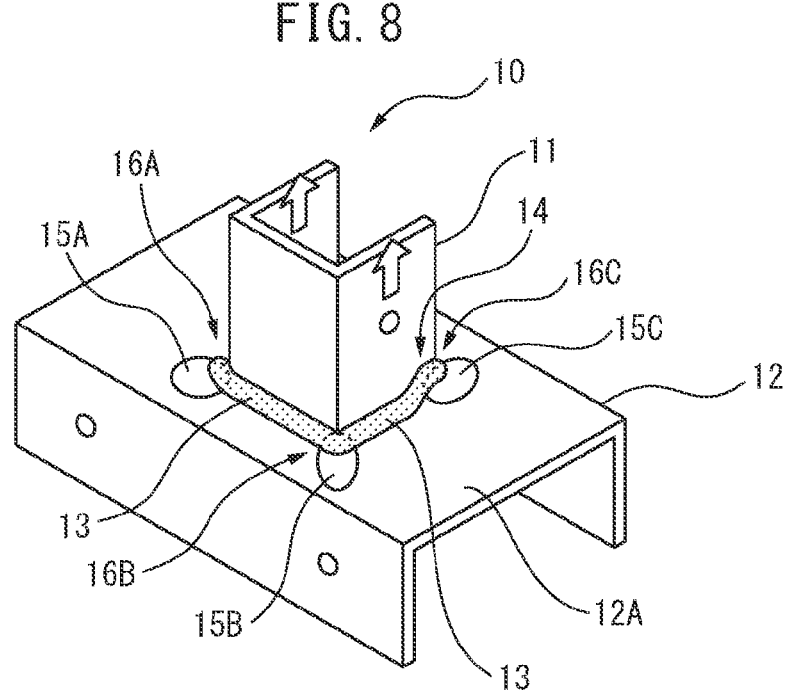
FIG. 8 is a perspective view showing a first example of a welded structural member.

FIG. 8 is a perspective view showing a first embodiment of a welded structural member. The welded structural member 10 shown in FIG. 8 is comprised of one channel member (steel channel) 12 on the upper surface 12A of which one end part of another channel member 11 is made to abut, where at the abutting parts, only the parts at the outside from the surfaces of the channel member 11 are fillet welded.

The fillet bead 13 includes two corner parts 16A and 16B in the middle of it. Here, if applying a repeated load envisioned as being applied to the welded structural member 10 to the welded structural member 10, the main stress becomes large at the corner parts 16A and 16B of the channel member 11 and at the beginning and ending portions 16C of the fillet bead. The main stress at 16C is assumed to become the maximum main stress.

In this case, first, if forming press beads at the positions of maximum main stress of the beginning and ending portions 16C, the fatigue strength is improved. By forming press beads at the beginning and ending portions 16C, the positions which first fracture when a repeated load is applied move to the corner parts 16A and 16B. Therefore, if forming the press beads at the corner parts 16A and 16B, the fatigue strength further rises. In FIG. 8, notches 14 are formed in advance in the channel member 11 at the positions of the beginning and ending portions 16C, then the press beads 15C are fit into them, so the fatigue strength is further improved. While not shown, if forming notches in advance in the channel member 11 at the positions of the corner parts 16A and 16B and making the press beads 15A and 15B cross the channel member 11, the fatigue strength is further improved. The press beads 15A, 15B, and 15C are formed on the top surface 12A so as to project upward at the fillet bead 13 side. One press bead each need only be formed at a single location.

As shown in FIG. 8, when forming the fillet bead 13, the top surface part 12A is pressed in advance to form the press beads 15A, 15B, and 15C in directions crossing the directions of the fillet bead 13 so that locations overlapping with the fillet bead 13 are included. The press beads 15A, 15B, and 15C have to be formed to sufficiently secure contact between that one end part of the channel member 11 and the top surface 12A and not form unnecessary clearances.

Second Embodiment

Figure 9:
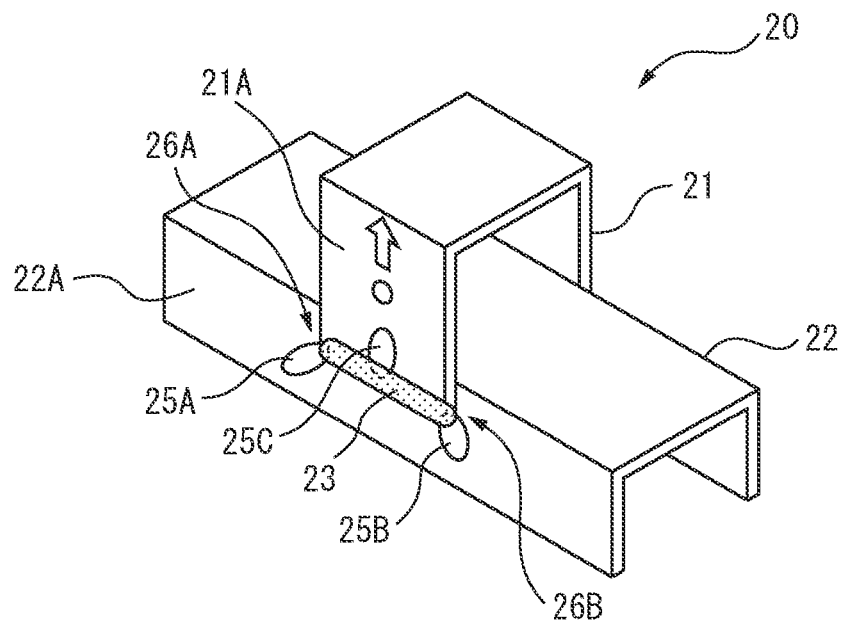
FIG. 9 is a perspective view showing a second example of a welded structural member.

FIG. 9 is a perspective view showing a second embodiment of a welded structural member. FIG. 9 shows an example of a lap fillet arc welded joint wherein the sheet surface parts of the one metal member and the other metal member are joined with each other. The welded structural member 20 shown in FIG. 9 is formed by attaching the back surfaces of the flange parts at the two sides of the channel member 21 to the mutually facing side surfaces of the channel member 22 and lap fillet welding the front end parts of the flange parts. As shown in FIG. 9, upwardly projecting press beads 25A and 25B are formed at the side surfaces 22A of the channel member 22 in advance at the fillet bead 23 sides at locations corresponding to the vicinities of the boundaries (end parts 26A and 26B) between the front end parts of the flange parts of the channel member 21 and the base end parts of the channel member 22 so that the parts where the fillet beads 23 are formed are included.

Further, to improve the joint strength of the fillet bead 23, as shown in FIG. 9, an upwardly projecting press bead 25C may be formed at the fillet bead 23 side in a direction crossing the direction of the fillet bead 23 so that the part where the fillet bead 23 is formed is included at the side surface 21A side of the flange part of the channel member 21. The press bead 25C is preferably formed at the center of the front end of the flange part, but a plurality may also be formed.

Third Embodiment

Figure 10:
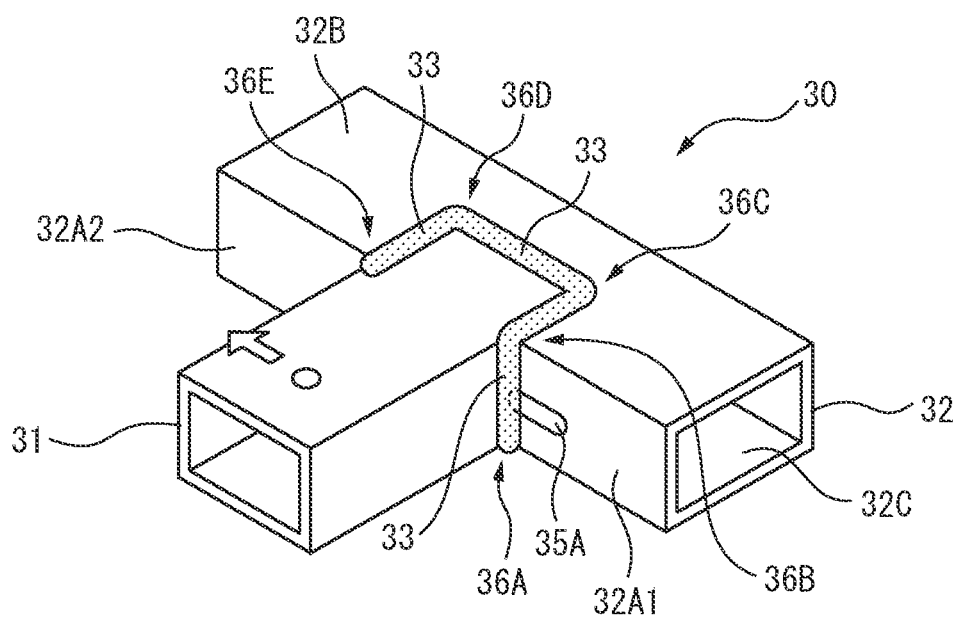
FIG. 10 is a perspective view showing a third example of a welded structural member.

FIG. 10 is a perspective view showing a third embodiment of a welded structural member. The welded structural member 30 shown in FIG. 10 is configured using a box member 32 made using a rectangular metal tube and a box member 31 comprised of a rectangular metal tube where one pair of surfaces of the two pair of mutually facing surfaces of the front end part are cut out to match the shape of the box member 32. The box member 32 and box member 31 are assembled so that the back surfaces of the parts of the front end part of the box member 31 which are not cut away abut against the front surface 32A2 of the box member 32 and so that the sheet thickness parts of the parts of the front end part of the box member 31 which are cut away abut against the front surface of the box member 32. The abutting parts are then fillet welded to form the welded structural member 30.

The fillet bead 33 formed at the welded structural member 30 has at least the corner parts of the corner parts 36A to 36E in the middle. The locations where fatigue cracks first form when applying to the welded structural member 30 not formed with a press bead a repeated load envisioned as being applied to a welded structural member 30 are assumed to be the corner parts where the sheet thickness parts of the parts of the front end part of the box member 31 which are cut away abut against the front surface of the box member 32.

However, if considering the direction of the load applied to the rectangular metal tube 31, the corner parts 36A, 36B, and 36E are the boundary parts of the side surfaces 32A1 and 32C, 32A1 and 32B, and 32B and 32A2 of the box member 32. By forming press beads at these parts, the effect of improvement of the joining strength of the fillet beads 33 is low. Therefore, here, instead of the corner parts 36A to 36E etc., at least one press bead is formed so that a part where the fillet bead 33 is formed is included at least at one of the side surfaces 32A1 and 32A2 of the box member 32. Further, in FIG. 10, one press bead 35A is formed at only the side surface 32A1 of the box member 32 so that the end part of the upwardly projecting part and the fillet bead 33 overlap, but a plurality of the press beads may also be formed at the same side surface.

Further, the embodiments of the present invention explained above all only show examples of specific application in working the present invention. The technical scope of the present invention must not be interpreted limitatively due to these. That is, the present invention can be worked in various forms without deviating from this technical idea or major features.

Fourth Embodiment

Figure 11:
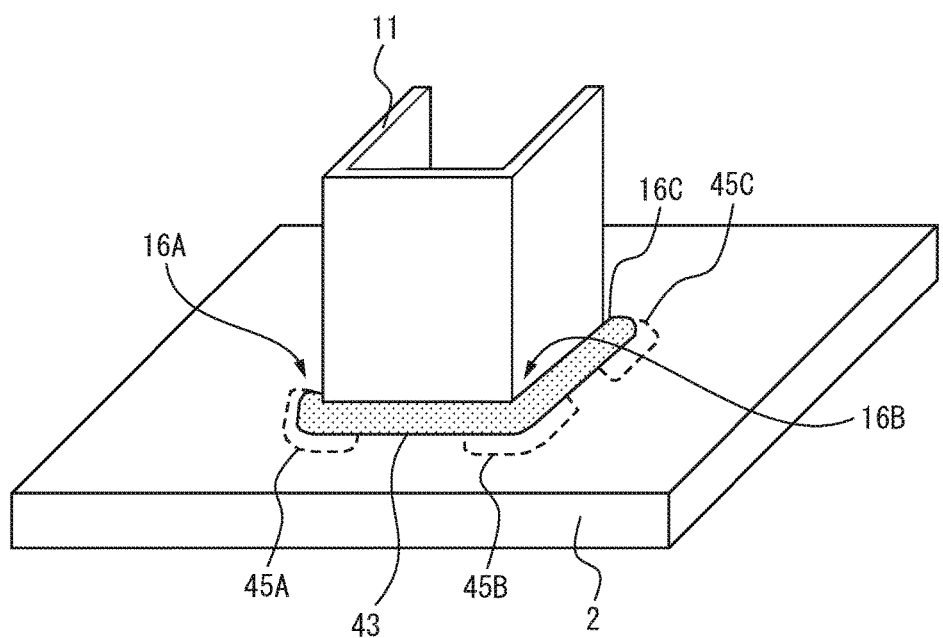
FIG. 11 is a perspective view showing a fourth example of a welded structural member.

FIG. 11 is a perspective view showing a fourth embodiment of a welded structural member. As shown in FIG. 11, one end part of the channel member 11 is made to abut against the top surface of the lower steel sheet 2. At the abutting part, only the part at the outside of the sheet surface of the channel member 11 is fillet welded. The fourth embodiment is characterized by having press beads 45A, 45B, and 45C formed along the fillet bead 43 at the corner parts 16A and 16B of the channel member 11 and the beginning or ending portion 16C of the fillet bead. These press beads are formed in advance by pressing the locations corresponding to the corner parts 16A and 16B of the channel member 11 and the beginning or ending portion 16C of the fillet bead so that the locations overlapping the fillet bead 43 are included.

EXAMPLES

Next, examples of the present invention will be explained, but the conditions of the examples are illustrations of the conditions employed for confirming the workability and effect of the present invention. The present invention is not limited to this illustration of the conditions. The present invention can employ various conditions so long as not deviating from the gist of the present invention and achieving the object of the present invention.

The comparative example and invention examples of the welded structural members 10, 20, and 30 of the shapes shown in FIGS. 8 to 10 were fabricated under the conditions for forming the press beads shown in Tables 2 to 4. These welded structural members were used for fatigue tests. Note that, based on the findings based on the results of the fatigue strength tests of FIG. 14, the toe radius of a press bead was made one equal to the sheet thickness ($\rho'=1$).

The steel members and weld materials used for the welded structural members are shown in Table 1. In Table 1, the two types of steel members of the steel material A and steel material B were used. Further, as the steel sheet A and steel sheet B, two types of steel members were used. Further, as the steel sheet A and the steel sheet B, ones of two different sheet thicknesses (2.3 mm and 2.6 mm) were respectively prepared. Further, two types of weld materials of the wire A and wire B were used. The wires A and B had diameters of 1.2 mm.

TABLE 1

| | Static strength | | | Chemical composition | | | | | | |
|---|---|---|---|---|---|---|---|---|---|---|
| | YP (MPa) | TS (MPa) | EL (%) | C | Si | Mn | P | S | Al | N |
| | | | | (mass %) | | | | | | |
| Steel material A | 370 | 480 | 25 | 0.12 | 0.02 | 0.51 | 0.02 | 0.004 | 0.03 | 0.003 |
| Steel material B | 740 | 780 | 20 | 0.06 | 0.9 | 1.27 | 0.007 | 0.001 | 0.04 | 0.003 |
| Wire A | | — | | 0.08 | 0.35 | 0.85 | 0.011 | 0.005 | — | — |
| Wire B | | — | | 0.08 | 0.31 | 1.3 | 0.002 | 0.002 | — | — |

In the examples, the hat member 12 shown in FIG. 8 had a size of an X-direction (length) of 300 mm×Y-direction (width) of 150 mm×Z-direction (height) of 80 mm. The bracket member 11 had a size of an X-direction (width) of 80 mm×Y-direction (width) of 75 mm×Z-direction (height) of 80 mm.

In the examples, the hat member 22 shown in FIG. 9 had a size of an X-direction (length) of 300 mm×Y-direction (width) of 100 mm×Z-direction (height) of 50 mm. The bracket member 21 had a size of an X-direction (width) of 75 mm×Y-direction (width) of 105 mm×Z-direction (height) of 80 mm.

In the examples, the box member 32 shown in FIG. 10 had a size of an X-direction (length) of 300 mm, a Y-direction (width) of 100 mm, and a Z-direction (height) of 50 mm. On the other hand, the bracket member 31 was comprised of a rectangular steel tube of an X-direction (width) of 76 mm, a Y-direction (length) of 180 mm, and a Z-direction (height) of 56 mm with 25 mm cut off from the front end of the 180 mm length part.

Further, the fillet bead was formed under the following conditions of formation as common welding conditions:
Welding method: pulse mag welding
Welding current: 150 to 200 A
Welding voltage: 20 to 25V
Target position: corner of overlap part
Welding speed: 60 to 80 cm/min The fabricated welded structural member was gripped by an electrical hydraulic fatigue test apparatus so that the direction of load became the direction shown by the white arrows of FIG. 8 to FIG. 10 and was subjected to a fatigue test at a constant range of load (constant range of stress), a load ratio of 0.1, and a repetition frequency of 5 Hz.

In the present examples, when the "fatigue life improvement rate" in the case of testing a welded structural member provided with a press bead in the same range of load exceeded 120% of the fatigue life of a welded structural member not provided with a press bead, it was judged that there was an effect due to the press bead.

Regarding Examples Based on First Embodiment

Based on FIG. 8 and Table 2, results of examples of the first embodiment will be explained. The welded structural member 10 shown in FIG. 8 is formed by arranging a channel shaped bracket member 11 at the top surface 12A of the hat member 12 and fillet welding the outer circumference of the bracket member. Further, Test Piece C-1 is a comparative example in which no press bead is arranged, while Test Pieces C-2 to C-5 are invention examples in which press beads are arranged.

In Comparative Example C-1 where no press bead was arranged, cracks formed at the weld toe 16C at the hat member side of the fillet bead beginning portion or ending portion. Therefore, in Invention Example C-2, press beads 15C were arranged at positions of the top surface of the hat member corresponding to the fillet bead beginning and ending portions. Note that, the positions of arrangement of the press bead were the front end parts of the beginning and ending portions of the fillet bead, so the direction of the press bead was made a direction 90° with respect to the weld toe line of the weld toe 16C, that is, parallel to the weld line. Further, in Invention Example C-2, no notch was provided at the hat member: the fillet bead and the press bead were made to contact each other. As a result of the fatigue test, the life improvement rate increased to over 180% and the crack formation position changed from the fillet bead beginning and ending portions to the fillet bead corner parts. Therefore, in the Invention Example C-3, the press bead was arranged not only at the fillet bead beginning and ending portions, but also the fillet bead corner parts (15A and 15B). In the invention example, due to the increase in the positions of arrangement of the press beads and the effect of the increase in the lengths of the press beads (La/W), the fatigue life improvement rate became 270%. On the other hand, the crack formation position became from the fillet bead corner part to the boundary part of the beginning and ending portions of the fillet bead and the press bead.

To make the fatigue life of the fillet bead beginning and ending portions increase more, in Invention Example C-4, the welding work was performed by providing a notch 14 at the end part of the bracket member 11, arranging the press bead so that its upward projecting part fit in the notch of the bracket, and making the fillet bead ride over the press bead. By increasing the range of overlap of the press bead and the fillet bead, the fillet bead beginning and ending portions further rose in rigidity and the fatigue life improvement rate became 365%. Invention Example C-5 is an example providing a notch at a corner part of the bracket member as well and arranging a press bead so that the fillet bead and press bead crossed. The fatigue life improvement rate greatly increased to 548%.

TABLE 2

|  | Comparative Example C-1 | Invention Example C-2 | Invention Example C-3 | Invention Example C-4 | Invention Example C-5 |
| --- | --- | --- | --- | --- | --- |
| Member shape | FIG. 8 | FIG. 8 | FIG. 8 | FIG. 8 | FIG. 8 |
| Steel material | A | A | A | A | A |
| Weld material | A | A | A | A | A |
| Channel member 12 sheet thickness "t" (mm) | 2.3 | 2.3 | 2.3 | 2.3 | 2.3 |
| Channel member 11 sheet thickness (mm) | 2.3 | 2.3 | 2.3 | 2.3 | 2.3 |
| Beginning position of press bead | — | Welded ends of channel member 11 (total 2 locations) | Welded corners and ends of channel member 11 (total 4 locations) | Welded corners and ends of channel member 11 (total 4 locations) | Welded corners and ends of channel member 11 (total 4 locations) |

TABLE 2-continued

| | Comparative Example C-1 | Invention Example C-2 | Invention Example C-3 | Invention Example C-4 | Invention Example C-5 |
|---|---|---|---|---|---|
| Length of press bead (La) (mm) | — | 15.1 | 20.4 | 20.4 | 30.5 |
| Width of press bead (Wa) (mm) | — | 8.3 | 8.3 | 8.35 | 8.3 |
| Height of press bead (Ha) (mm) | — | 3.4 | 2.1 | 3.4 | 8.2 |
| Width of fillet bead (W) (mm) | 7.1 | 7.3 | 7.3 | 7.5 | 7.4 |
| La/W (%) | — | 207 | 279 | 272 | 412 |
| Wa/W (%) | — | 114 | 114 | 111 | 112 |
| Ha/t (%) | — | 148 | 148 | 148 | 357 |
| Notch position | — | None | None | Fillet bead ends (total 2 locations) | Fillet bead ends and corners (total 4 locations) |
| Angle of press bead | — | 90° with respect to toe line direction of fillet bead | 90° with respect to toe line direction of fillet bead | 90° with respect to toe line direction of fillet bead | 90° with respect to toe line direction of fillet bead |
| Fatigue life | 230000 | 430000 | 620000 | 840000 | 1260000 |
| Fatigue life improvement rate (%) | — | 187 | 270 | 365 | 548 |
| Test piece used as standard | — | Comparative Example C-1 | Comparative Example C-1 | Comparative Example C-1 | Comparative Example C-1 |
| Crack formation position | Toe portion of fillet bead end 15C | Toe portion of fillet bead corner 15B | Toe portion of fillet bead end 15C | Toe portion of fillet bead corner 15B | Toe portion of fillet bead corner 15B |

Regarding Examples Based on Second Embodiment

Figure 1A:
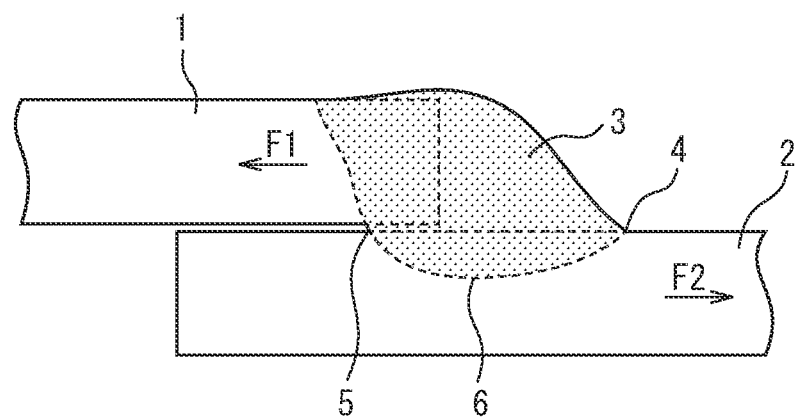
FIG. 1A is a cross-sectional view showing the cross-sectional shape of a lap fillet welded joint.
Figure 1B:
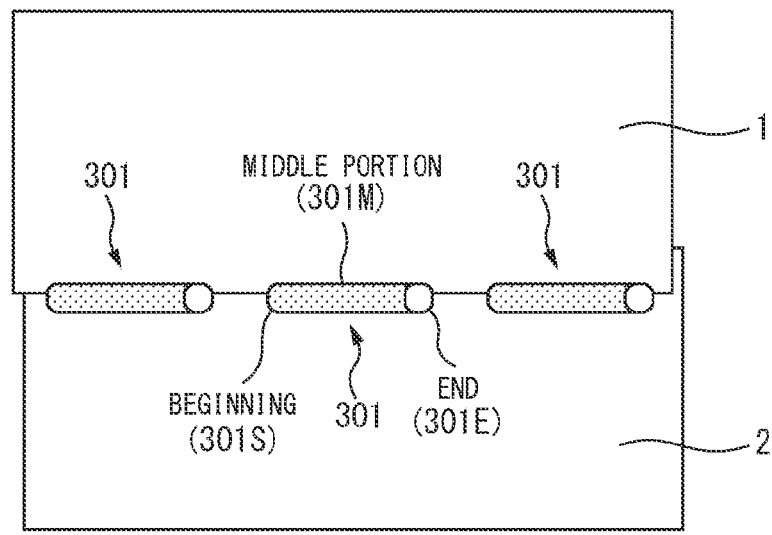
FIG. 1B(a) is a top view of a welded structure fabricated by partial weld beads, FIG. 1B(b) is a cross-sectional view at the beginning of a partial weld bead in the welded structure of FIG. 1B(a), FIG. 1B(c) is a cross-sectional view at a middle portion of a partial weld bead of the welded structure of FIG. 1B(a), and FIG. 1B(d) is a cross-sectional view at an end of a partial weld bead of the welded structure of FIG. 1B(a).
Figure 1B:
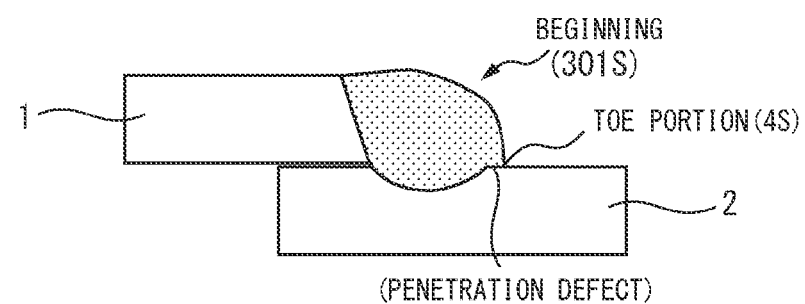
Figure 1B:
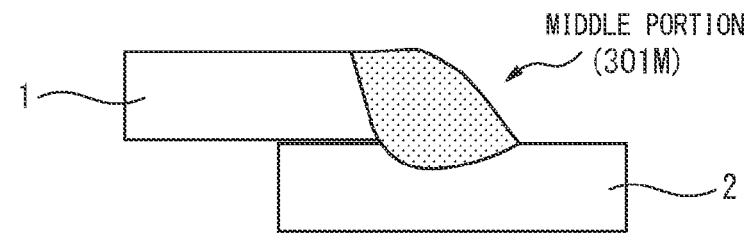
Figure 1B:
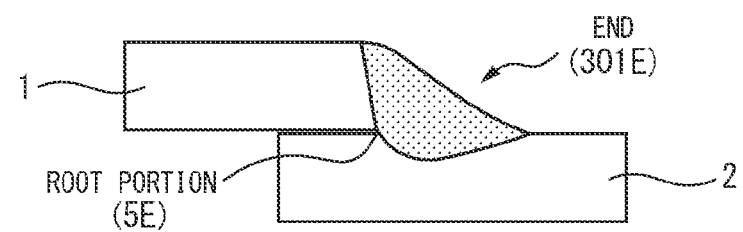
Figure 2:
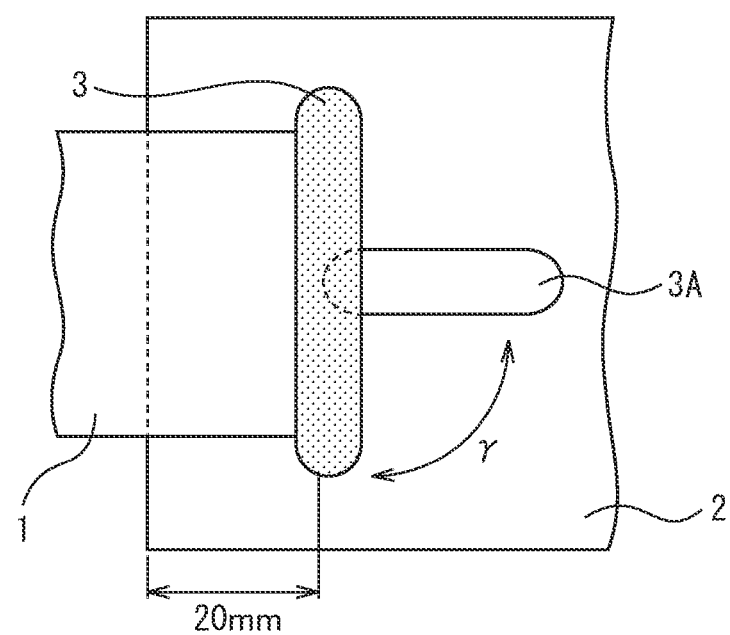
FIG. 2 is a top view showing a test piece of a lap fillet welded joint.
Figure 3:
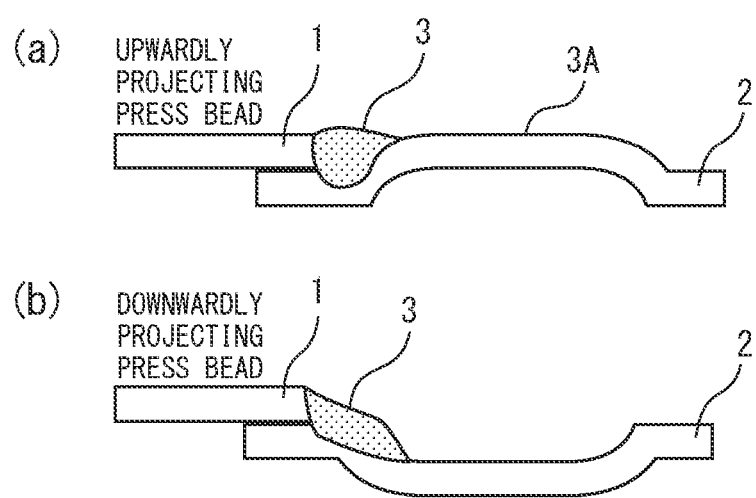
Figure 4:
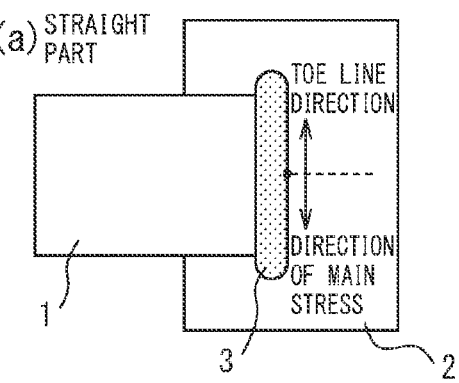
FIG. 4(a) is a top view showing a relationship between a toe line direction and weld line direction in the case of a straight fillet bead.
FIG. 4(b) is a top view showing a relationship between a toe line direction and tangential direction of the fillet bead in the case of a curved fillet bead.
FIG. 4(c) is a top view showing a relationship between a tangential direction of the fillet bead and the toe line direction of the bead near a beginning portion and ending portion of the fillet bead.
FIG. 4(d) is a top view showing a relationship between a tangential direction of the fillet bead and the toe line direction of the bead at the front end of a beginning portion and ending portion of the fillet bead.
Figure 4:
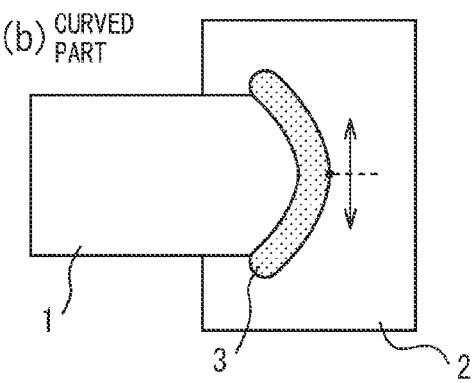
Figure 4:
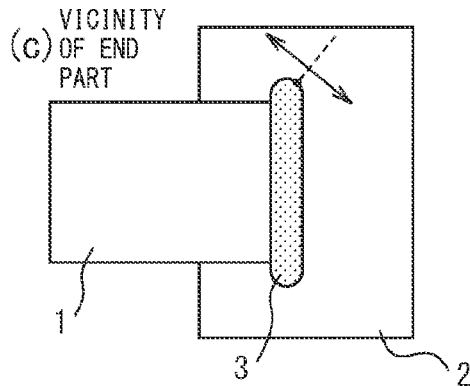
Figure 4:
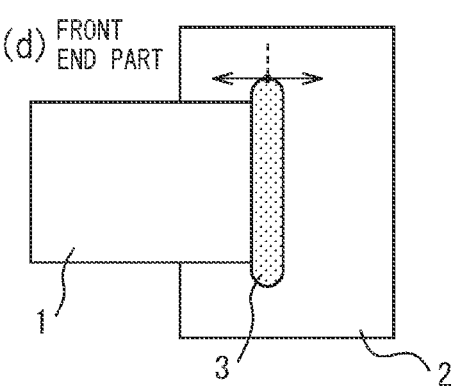

Based on FIG. 9 and Table 3, examples of the second embodiment will be explained. The welded structural member 20 shown in FIG. 9 was fabricated by arranging a channel shaped bracket 21 covering a hat member 22 and joining them by lap fillet welding. In Comparative Example D-1 with no press bead, a crack formed from the root at the center part of the fillet bead (location corresponding to reference numeral 5 of FIG. 1A). Therefore, in Invention Example D-2, the press beads 25A and 25B were arranged so as to contact the beginning and ending portions of the fillet bead. Note that, the angles of the press beads were 90° with respect to the toe line there, that is, 45° with respect to the weld line of the fillet bead. In the fatigue test, the life improvement rate increased to 132%. Invention Example D-3 had the press beads arranged identically to D-2, but had a length and height of the press bead increased over D-2. As a result, the fatigue life improvement rate further increased to 212%. Invention Example D-4 had the press bead 25C provided at the center part of the fillet bead at the bracket 21 side, in addition to the press beads at the fillet bead beginning and ending portions, so due to the effect of improvement of rigidity of the welded joint due to the increase in the press beads, the fatigue life improvement rate greatly increased to 347%.

TABLE 3

| | Comparative Example D-1 | Invention Example D-2 | Invention Example D-3 | Invention Example D-4 |
|---|---|---|---|---|
| Member shape | FIG. 9 | FIG. 9 | FIG. 9 | FIG. 9 |
| Steel material | B | B | B | B |
| Weld material | B | B | B | B |
| Channel member 22 sheet thickness "t" (mm) | 2.9 | 2.9 | 2.9 | 2.9 |
| Channel member 21 sheet thickness (mm) | 2.9 | 2.9 | 2.9 | 2.9 |
| Beginning position of press bead | — | Left and right ends of front end of flange of channel member 21 (2 locations each at two sides) | Left and right ends of front end of flange of channel member 21 (2 locations each at two sides) | Front end of flange of channel member 21 (1) Left and right ends (2 locations each at two sides) (2) Near center (1 location each at two sides) |
| Length of press bead (La) (mm) | — | 10.3 | 20.4 | 30.51 |

TABLE 3-continued

|  | Comparative Example D-1 | Invention Example D-2 | Invention Example D-3 | Invention Example D-4 |
| --- | --- | --- | --- | --- |
| Width of press bead (Wa) (mm) | — | 7.5 | 10.5 | 12.5 |
| Height of press bead (Ha) (mm) | — | 2.1 | 4.3 | 6.4 |
| Width of fillet bead (W) (mm) | 9.7 | 9.7 | 9.6 | 9.7 |
| La/W (%) | — | 106 | 213 | 314 |
| Wa/W (%) | — | 77 | 109 | 129 |
| Ha/t (%) | — | 72 | 148 | 221 |
| Notch position | — | None | None | None |
| Angle of press bead | | 90° with respect to toe line direction of fillet bead | 90° with respect to toe line direction of fillet bead | 90° with respect to toe line direction of fillet bead |
| Fatigue life | 340000 | 450000 | 720000 | 11830000 |
| Fatigue life improvement rate (%) | — | 132 | 212 | 347 |
| Test piece used as standard | — | Comparative Example D-1 | Comparative Example D-1 | Comparative Example D-1 |
| Crack formation position | Weld root of fillet bead at channel member 22 side | Weld root of fillet bead at channel member 22 side | Weld root of fillet bead at channel member 22 side | End of fillet bead |

Regarding Examples Based on Third Embodiment

Based on FIG. 10 and Table 4, examples of the third embodiment will be explained. The welded structural member 30 shown in FIG. 10 was a welded joint comprised of a box member 31 and a box member 32 arranged in a T-shape. The side surfaces of the box members were joined by butt fillet welding, while the top and bottom surfaces of the box member were joined by lap fillet welding. If a load acted on the box member 31 in the horizontal direction, fatigue cracks easily formed at the butt fillet welded side surfaces of the box member 32, so the press bead should be arranged at those locations. In Comparative Example E-1 with no press bead, a crack formed from the weld toe at the center part of the fillet bead at the box member 32 side. Therefore, the press bead was arranged so as to contact the fillet bead at that location. Invention Example E-2 had an angle of provision of the press bead of 30° with respect to the weld toe line, so the effect of improvement of the rigidity was insufficient and the fatigue life improvement rate stopped at 129%. Invention Example E-3 had a larger size of the press bead and an angle of provision of the press bead of 45° with respect to the weld toe line, so the fatigue life improvement rate increased to 239%. Invention Example E-4 had a larger width and height of the press bead and an angle of provision of the press bead of 90° (35A) with respect to the weld toe line, so the fatigue life improvement rate greatly increased to 417%.

TABLE 4

|  | Comparative Example E-1 | Invention Example E-2 | Invention Example E-3 | Invention Example E-4 |
| --- | --- | --- | --- | --- |
| Member shape | FIG. 10 | FIG. 10 | FIG. 10 | FIG. 10 |
| Steel material | B | B | B | B |
| Weld material | B | B | B | B |
| Box member 32 sheet thickness "t" (mm) | 1.8 | 1.8 | 1.8 | 1.8 |
| Box member 31 sheet thickness (mm) | 2.3 | 2.3 | 2.3 | 2.3 |
| Beginning position of press bead | — | Center of fillet bead 33 formed at side surface 32A1 of box member 32 (1 each at two sides) | Center of fillet bead 33 formed at side surface 32A1 of box member 32 (1 each at two sides) | Center of fillet bead 33 formed at side surface 32A1 of box member 32 (1 each at two sides) |
| Length of press bead (La) (mm) | — | 10.3 | 30.5 | 30.5 |
| Width of press bead (Wa) (mm) | — | 7.5 | 10.5 | 15.1 |
| Height of press bead (Ha) (mm) | — | 2.1 | 4.3 | 7.5 |
| Width of fillet bead (W) (mm) | 6.7 | 6.9 | 6.9 | 7.1 |
| La/W (%) | — | 149 | 442 | 430 |
| Wa/W (%) | — | 109 | 152 | 213 |
| Ha/t (%) | — | 117 | 239 | 417 |
| Angle of press bead | — | 30° with respect to toe line direction of fillet bead | 45° with respect to toe line direction of fillet bead | 90° with respect to toe line direction of fillet bead |
| Fatigue life | 210000 | 275000 | 433000 | 480000 |
| Fatigue life improvement rate (%) | — | 129 | 205 | 229 |
| Test piece used as standard | — | Comparative Example E-1 | Comparative Example E-1 | Comparative Example E-1 |
| Crack formation position | Weld toe of fillet bead at box member 32 side | Overlap part of fillet bead and press bead | Overlap part of fillet bead and press bead | Overlap part of fillet bead and press bead |

INDUSTRIAL APPLICABILITY

Above, the present invention was explained using mainly a fillet welded joint, but the present invention has a high applicability in the machine industry and also the industry welding steel sheets and other metal members. That is, the present invention is not limited to a welded structural member for automotive use and can also be utilized for a structure comprised of several materials or members etc. such as rolling stock or aircraft or other transport machinery, mechanical structures, home electric appliances, etc. Further, the present invention is not limited to steel sheets and can be applied to iron sheets, aluminum sheets, titanium alloy sheets, or sheet members containing a metal and resin.

REFERENCE SIGNS LIST 1. upper steel material
1A. notch
2. lower steel material
3. fillet weld bead
3A. press bead
4. toe
5. root
10. welded structural member
11. channel member
12. hat member
13. fillet bead
14. notch part
15A to 15C. press beads
16A, 16B. corner parts of channel member
16C. beginning and ending portions of fillet bead
20. welded structural member
21. channel member
22. channel member
23. fillet bead
24. fillet bead
25A to 25C. press bead
30. welded structural member
31. box member
32. box member
33. fillet bead
35A. press bead
36A to 36E. corner parts of fillet bead
40. welded structural member
43. fillet bead
45A to 45C. press beads
θ. toe angle

The invention claimed is:

1. A fillet welded joint formed by fillet welding at least two metal members, wherein
on the surface of at least one of the metal members, the fillet welded joint comprises a press bead of a rib-shaped projection provided by press-forming so as to project upward to a side having a weld bead formed by the fillet welding, wherein
part of the press bead contacts or overlaps the weld bead, and wherein
a longitudinal direction of the press bead is 45° to 135° with respect to a direction of a weld toe line of the weld bead.

2. The fillet welded joint according to claim 1, wherein the press bead has a toe radius Ra (mm) which is equal to or longer than a thickness "t" (mm) of the metal member having the press bead.

3. The fillet welded joint according to claim 1, wherein the press bead satisfies $$La \geq 2W,$$

$$Ha \geq t, \text{ and}$$

$$Wa \geq W$$

where "La" expresses a length in a longitudinal direction of the press bead, "Ha" expresses a height of the press bead, "Wa" expresses a width of the press bead, "W" expresses a width of the weld bead, and "t" expresses a thickness of the metal member having the press bead.

4. The fillet welded joint according to claim 1, wherein the press bead crosses the weld bead.

5. The fillet welded joint according to claim 1, wherein the press bead overlaps the weld bead at a part where a previously established maximum main stress is caused.

6. The fillet welded joint according to claim 1, wherein the metal member welded with the metal member at which the press bead is formed comprises a notched part fitting in the press bead at the location where the press bead is welded.

7. The fillet welded joint according to claim 1, wherein
at least one of the metal members has a cross-sectional shape comprising a folded corner part which is fillet welded to the other metal member, and wherein
the press bead is superposed at the corner part of the weld bead.

8. A method for producing a fillet welded joint by fillet welding at least two metal members,
the method comprising press forming on the surface of at least one of the metal members a press bead of a rib-shaped projection so as to project upward to a side having a weld bead formed by the fillet welding and
fillet welding the metal members so that a part of the press bead contacts or is superposed with the weld bead.

9. The method for producing a fillet welded joint according to claim 8, further comprising forming a longitudinal direction of the press bead to be 45° to 135° with respect to a direction of a weld toe line of the weld bead.

10. The method for producing a fillet welded joint according to claim 8, further comprising forming the press bead having a toe radius Ra (mm) which is equal to or more than a thickness "t" (mm) of the metal member having the press bead.

11. The method for producing a fillet welded joint according to claim 8, wherein the press bead satisfies $$La \geq 2W,$$

$$Ha \geq t, \text{ and}$$

$$Wa \geq W$$

where "La" expresses a length in a longitudinal direction of the press bead, "Ha" expresses a height of the press bead, "Wa" expresses a width of the press bead, "W" expresses a width of the weld bead, and "t" expresses a thickness of the metal member having the press bead.

12. The method for producing a fillet welded joint according to claim 8, further comprising forming the press bead to cross the weld bead.

13. The method for producing a fillet welded joint according to claim 8, further comprising forming the press bead to contact or overlap the weld bead at a part where a previously established maximum main stress is caused.

14. The method for producing a fillet welded joint according to claim 8, further comprising forming a notched part, the notched part being fit into in the press bead at the location welded with the press bead in the metal member welded with the metal member at which the press bead is formed.

15. The method for producing a fillet welded joint according to claim 8, wherein
at least one of the metal members has a cross-sectional shape comprising a folded corner part, and wherein
the method comprises fillet welding the folded corner part to the other metal member and forming the press bead in advance at the other metal member so that the press bead is superposed at the corner part of the weld bead.

* * * * *